United States Patent
Fujioka et al.

(10) Patent No.: US 9,350,746 B2
(45) Date of Patent: May 24, 2016

(54) TRANSMISSION NETWORK SYSTEM, TRANSMISSION METHOD, AND AUTHENTICATION INFORMATION DEVICE

(71) Applicant: HITACHI, LTD., Tokyo (JP)

(72) Inventors: Shinya Fujioka, Tokyo (JP); Yoshihiro Ashi, Tokyo (JP); Masahiko Mizutani, Tokyo (JP)

(73) Assignee: Hitachi, Ltd., Tokyo (JP)

(*) Notice: Subject to any disclaimer, the term of this patent is extended or adjusted under 35 U.S.C. 154(b) by 151 days.

(21) Appl. No.: 14/161,888

(22) Filed: Jan. 23, 2014

(65) Prior Publication Data

US 2014/0215566 A1 Jul. 31, 2014

(30) Foreign Application Priority Data

Jan. 25, 2013 (JP) ................. 2013-011684

(51) Int. Cl.
*H04L 29/00* (2006.01)
*H04L 29/06* (2006.01)
*H04L 9/32* (2006.01)
*H04J 3/06* (2006.01)

(52) U.S. Cl.
CPC ............ *H04L 63/123* (2013.01); *H04L 9/3294* (2013.01); *H04L 63/108* (2013.01); *H04J 3/0667* (2013.01); *H04L 2463/121* (2013.01)

(58) Field of Classification Search
CPC . G06F 21/03; G06F 21/04; G06F 2221/2151; H04L 9/32; H04L 2463/121; H04L 63/08; H04L 63/01
USPC ................. 726/1–14, 26–30; 713/150–154, 713/160–161, 168–181
See application file for complete search history.

(56) References Cited

U.S. PATENT DOCUMENTS 5,189,700 A * 2/1993 Blandford ...................... 713/178
6,393,566 B1 * 5/2002 Levine .......................... 713/178

(Continued)

FOREIGN PATENT DOCUMENTS

JP 2002-366031 A 12/2002

OTHER PUBLICATIONS

"IEEE Standard for a Precision Clock Synchronization Protocol for Networked Measurement and Control Systems". IEEE Instrumentation and Measurement Society, IEEE Std 1588-2008, Jul. 24, 2008.

*Primary Examiner* — Madhuri Herzog
(74) *Attorney, Agent, or Firm* — Mattingly & Malur, PC

(57) ABSTRACT

A transmission network system includes a network terminating device connected to a user terminal and an authentication information device connected to the network terminating device through a transmission network. The transmission network is connected to a reference clock that holds a reference time. The network terminating device includes a terminating internal clock that synchronizes with the reference clock, when receiving a first frame from the user terminal, generates a second frame including a time outputted from the terminating internal clock as a request time on the basis of the first frame, and transmits the second frame to the authentication information device. The authentication information device generates time authentication information based on the request time included in the received second frame, generates a third frame including the generated time authentication information, and transmits the third frame to the transmission network.

14 Claims, 19 Drawing Sheets

(56) References Cited

U.S. PATENT DOCUMENTS 6,751,733 B1 * 6/2004 Nakamura et al. ............ 713/182
6,993,656 B1 * 1/2006 Peyravian et al. ............ 713/178
2003/0140226 A1 * 7/2003 Yamamoto .......... H04L 63/0823
 713/156
2009/0041250 A1 * 2/2009 Park ...................... G06F 21/445
 380/277

* cited by examiner

FIG. 15

| SYSTEM ID | NODE ID | VALID |
|---|---|---|
| 1 | 100 | VALID |
| 1 | 101 | VALID |
| 2 | 200 | INVALID |
| ... | ... | VALID |

| SYSTEM ID | NODE ID | TIME DIFFERENCE INFORMATION |
|---|---|---|
| 1 | 100 | 100ms |
| 1 | 101 | 50ms |
| 2 | 200 | 500ms |
| ... | ... | ... |

310151 — SYSTEM ID
310152 — NODE ID
310153 — TIME DIFFERENCE INFORMATION
31015

TRANSMISSION NETWORK SYSTEM, TRANSMISSION METHOD, AND AUTHENTICATION INFORMATION DEVICE

CROSS-REFERENCE TO RELATED APPLICATION

This application claims the priority of Japanese Patent Application No. 2013-011684 filed Jan. 25, 2013, which is incorporated herein by reference in its entirety.

BACKGROUND OF THE INVENTION

1. Field of the Invention

The present invention relates to a transmission network system.

2. Description of the Related Art

As a method of authenticating a time when certain data is generated or processed, there is a time authentication method through a transmission network. As a conventional general time authentication method, there is a method in which a user device transmits an authentication request and authentication object data to an authentication server connected through a transmission network as an authentication request process in the user device (such as a computer). The conventional time authentication method is a method in which the authentication server authenticates a time when the authentication server receives the authentication object data as an authentication time.

Although the authentication time that is authenticated as a time when data is generated or processed should be in nature a time when a user performs the authentication request process, the authentication time in the conventional time authentication method is a reception time by the authentication server. There is a difference between the time when the authentication request process is performed and the reception time of the authentication server. The difference between the times is a delay time from several milliseconds to several seconds depending mainly on a transmission distance in the network between the user device and the authentication server and the number of passed nodes. The delay time is different for each user device.

When the intended use of the time authentication is a conventional main use of the time authentication such as a use for authenticating a time when a patent document or an accounting document is generated or processed, it cannot necessarily be said that the difference between the time when the authentication request process is performed and the reception time of the authentication server is a problem. However, in services varying in recent years as the number of users increases and the speed of transmission networks increases, in particular, in electronic commerce and the like, when authenticating a time when a user performs a transaction request or performing transaction sequence management based on the time, the difference between the times is a problem.

Specifically, in the electronic commerce and the like, a delay time between the user device and the authentication server due to the transmission network is a cause of inequality that directly affects a large pecuniary profit or loss of the user, so that the delay time becomes a problem. Therefore, the delay time between the user device and the authentication server is a problem to be solved for a service provider to guarantee impartial provision of services to users.

As the time authentication method, a method is considered in which the user device adds the authentication time to the authentication object data and the authentication server performs the time authentication on the basis of the authentication time added to the authentication object data. However, this method has a problem of accuracy and credibility of the time because the method uses the time managed by the user device.

Conventionally, a technique for solving the problem due to the delay time between the user device and the authentication server in these time authentication methods is proposed (for example, see JP-2002-366031-A). In the JP-2002-366031-A, a problem is described as follows: "An object of the present invention is to provide a technique to issue and authenticate a high-accuracy and high-reliability authentication time which is a processing time of processing information of a computer". A means for solving the problem is described as follows: "A configuration is employed in which accuracy of a clock is improved by synchronizing the clock with a reliable time acquired from a network, the clock is designed to be not able to be operated from inside, and the clock is designed to be able to be operated from outside by only a determined procedure, and a configuration is employed in which when authentication time issuance is requested, the authentication time for the authentication time issuance request is issued by using a time generated by the clock. Thereby, a high-accuracy authentication time without falsification can be issued. Then a configuration is employed in which an encrypted authentication time recorded in processing information in this way is decoded and the decoded authentication time is authenticated as the processing time of the processing information. Thereby, it is possible to authenticate the processing time of the processing information to be authenticated with high accuracy and high reliability".

On the other hand, as techniques for synchronizing times of devices in a transmission network, NTP (Network Time Protocol), IEEE 1588v2/PTP (Precision Time Protocol), or the like are known (see, IEEE 1588-2008). Any of these techniques defines a time synchronization method between a server that provides a stable time and a client that follows the time of the server. Although the accuracy of the time synchronization depends on an implementation method of the device, it is said that the accuracy is millisecond order in the NTP and microsecond order in the IEEE 1588v2/PTP.

SUMMARY OF THE INVENTION

As described in "2. Description of the Related Art", the conventional time authentication method has a problem of impartiality, accuracy, and reliability of the authentication time due to the delay time in communication through the transmission network.

Further, when using the method of JP-2002-366031-A, the issuance of the authentication time is performed by a function of the user's terminal device, so that it is not possible to perfectly prevent falsification. This is because the function to issue the authentication time is implemented in the device managed by a user, so that it is impossible to deny the probability that a malicious user analyzes and falsifies the authentication time.

In JP-2002-366031-A, an encryption process and a decoding process are performed between an authentication time issuance device and a time authentication device to prevent the authentication time from being falsified, so that the authentication time issuance device and the time authentication device always need to be combined and implemented. However, when a plurality of different services are applied to one system while the services through a transmission network vary, the number of combinations of the authentication time issuance device and the time authentication device required for each service management company increases. In particular, the cost for installing a large number of authentication time issuance devices equipped with high-level functions in a user site increases and the increase of the cost becomes a problem.

An object of the present invention is to provide a time authentication method which can authenticate a time without being affected by a delay time of the transmission network while preventing the authentication time from being falsified by a user. Further, another object of the present invention is to provide a time authentication method which can suppress the increase of the cost of implementation.

According to a representative aspect of the present invention, there is provided a transmission network system including: a network terminating device connected to a user terminal; and an authentication information device connected to the network terminating device through a transmission network, wherein the transmission network is connected to a reference clock that holds a reference time, the network terminating device includes a terminating internal clock that synchronizes with the reference clock, when receiving a first frame from the user terminal, generates a second frame including a time outputted from the terminating internal clock as a request time on the basis of the first frame, and transmits the second frame to the authentication information device, and the authentication information device generates time authentication information based on the request time included in the received second frame, generates a third frame including the generated time authentication information, and transmits the third frame to the transmission network.

According to an embodiment of the present invention, in a system for authenticating a time, it is possible to authenticate a time by using a time that is not affected by a delay time in the transmission network.

Problems, configurations, and effects other than those described above will be clarified by the description of embodiments below.

BRIEF DESCRIPTION OF THE DRAWINGS

FIG. 15 is an illustration showing a device management table of the second embodiment;

FIG. 19 is an illustration showing a time evaluation table of the third embodiment.

DESCRIPTION OF THE PREFERRED EMBODIMENTS

First Embodiment

In the present embodiment, an example of a transmission network system will be described which performs time authentication based on a request reception time in a network terminating device installed in a user site when time authentication of data generated or updated by a user is performed through a transmission network. The time authentication in the present embodiment indicates that a time when a user generates or updates data is authenticated by a device to which the user transmits the data or a device different from a device used by the user.

The time authentication in the present embodiment may be used for any purpose. For example, the time authentication in the present embodiment may be used for a purpose to authenticate a time when a patent document, an accounting document, or the like is created or edited in the same manner as in a general time authentication service or a purpose to authenticate a transaction request time in electronic commerce or manage a transaction sequence based on the time. In the present embodiment described below, details of purposes of information where the time authentication is performed will not be described, and only an example will be described.

Figure 1:
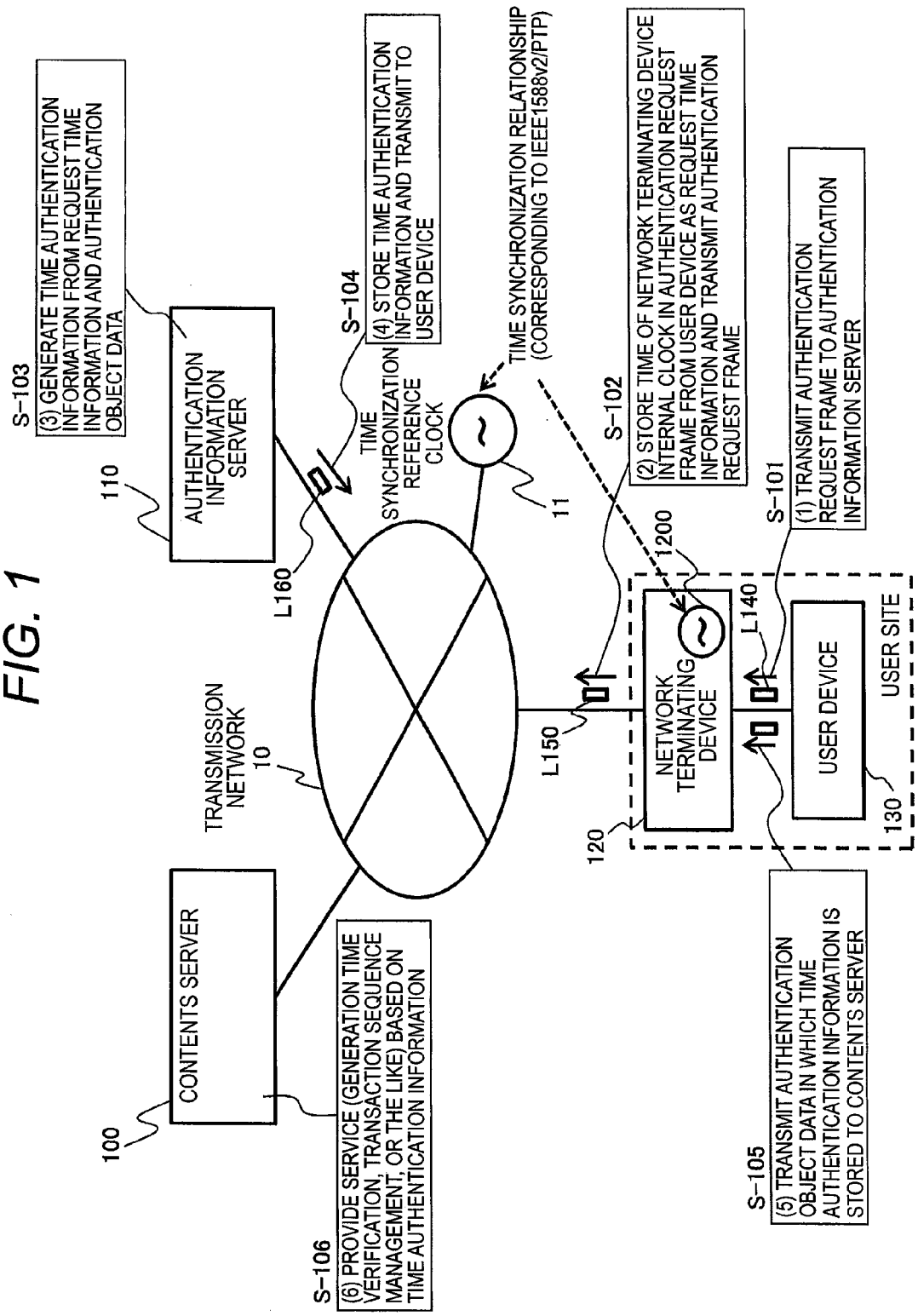
FIG. 1 is an illustration showing a configuration example of a transmission network system of a first embodiment.

FIG. 1 is an illustration showing a configuration example of a transmission network system of the first embodiment.

The transmission network system illustrated in FIG. 1 includes a contents server 100, an authentication information server 110, a network terminating device 120, a user device 130, a transmission network 10, and a time synchronization reference clock 11. The contents server 100, the authentication information server 110, the network terminating device 120, and the user device 130 are computers including a processor and a memory.

The authentication information server 110 is a server for authenticating a time when data or the like generated in the user device 130 is generated.

The transmission network 10 is a network such as, for example, the Internet. The time synchronization reference clock 11 is connected to the transmission network 10 and holds a time in the transmission network 10. The time synchronization reference clock 11 is mounted in a device such as, for example, a computer.

The user device 130 shown in FIG. 1 is connected to the authentication information server 110 and the contents server 100 through the network terminating device 120 and the transmission network 10. Although not illustrated here, there are a plurality of user devices 130 and network terminating devices 120 for each user who uses the transmission network system. Each of the plurality of user devices 130 and each of the plurality of network terminating devices 120 have the functions described below.

The network terminating device 120 is a communication device such as, for example, an optical media converter which is widely used as a device that converts between an optical interface and an electrical interface. The network terminating device 120 is installed in, for example, a user site which is located near a place where the user device 130 is installed. Therefore, a time required for the user device 130 and the network terminating device 120 to communicate with each other is sufficiently smaller than a time required for the user device 130 and the authentication information server 110 to communicate with each other. The network terminating device 120 is not managed by a user, but is managed by, for example, a telecommunications company that manages the transmission network 10.

The network terminating device 120 has a function to synchronize time with the time synchronization reference clock 11 through the transmission network 10. The network terminating device 120 includes an internal clock 1200. The internal clock 1200 establishes a synchronization relationship with the time of the time synchronization reference clock 11 by accuracy when, for example, a technique of IEEE 1588v2/PTP or the like is used for time synchronization.

The contents server 100 is a server that provides a service of document generation time authentication or a service of electronic commerce to the user device 130 by using an authenticated time. A plurality of contents servers 100 may be installed for each service. The services which the contents server 100 provides to the user device 130 include, for example, a bidding time management service and common DB management.

Although FIG. 1 illustrates that information used for time authentication processing and information for time synchronization are transferred through one transmission network 10, they may be transferred through a plurality of transmission networks 10.

Figure 2:
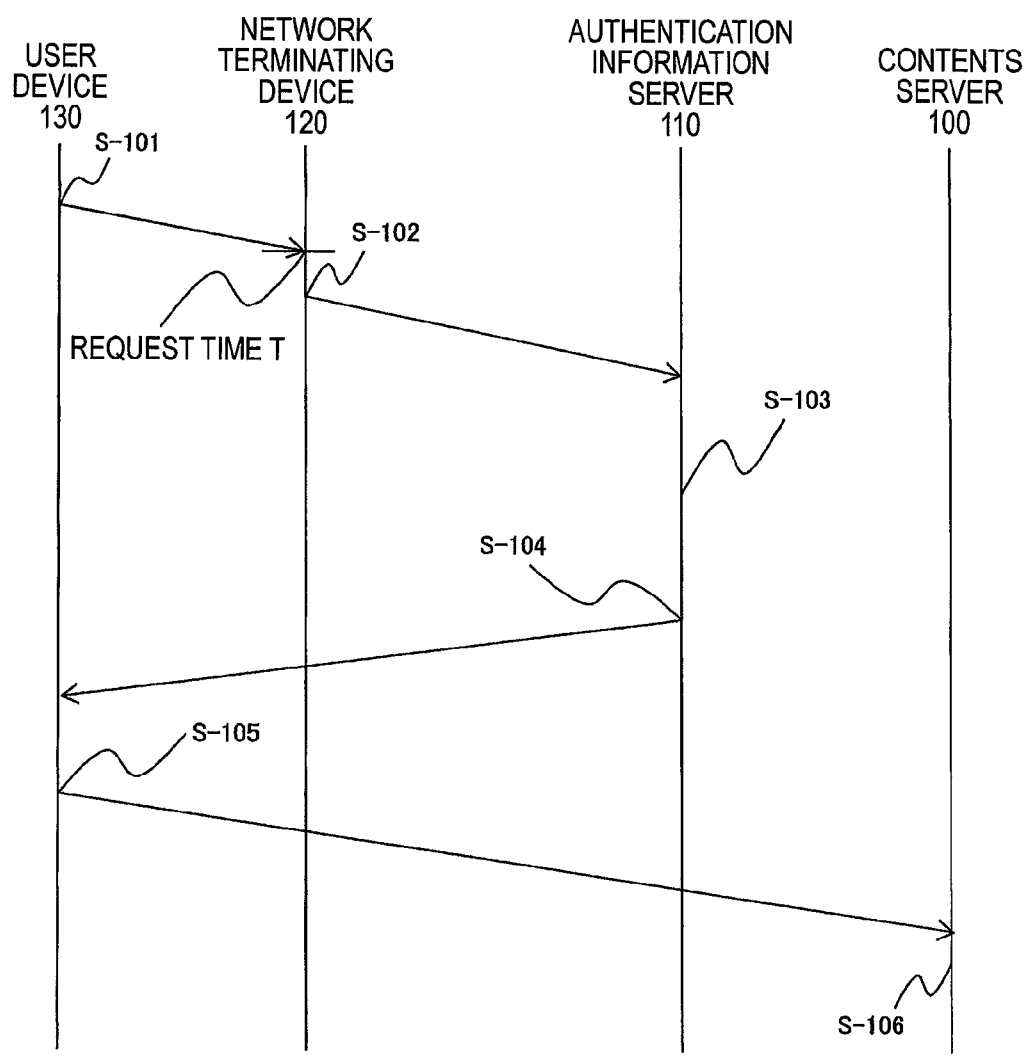
FIG. 2 is a sequence diagram illustrating processing between devices in the transmission network system of the first embodiment.

FIG. 2 is a sequence diagram illustrating processes between devices in the transmission network system of the first embodiment.

FIG. 2 illustrates processes between devices in the transmission network system in time series. A procedure of the time authentication in the present embodiment will be described with reference to FIGS. 1 and 2.

The user device 130 transmits a frame L140 to the authentication information server 110 (S-101). The frame L140 includes part or all of data generated or updated by a user as the authentication object data.

When the network terminating device 120 receives the frame L140, as illustrated in FIG. 2, the network terminating device 120 defines a time when the frame L140 is received as a request time T and generates a frame L150 including the request time T and information of the frame L140. Then, the network terminating device 120 transmits the generated frame L150 to the authentication information server 110 through the transmission network 10 (S-102).

When the authentication information server 110 receives the frame L150, the authentication information server 110 extracts the request time T and the authentication object data included in the frame L150 and generates time authentication information including the extracted request time T and authentication object data (S-103). The authentication information server 110 generates the time authentication information. Thereby, a time of the authentication object data included in the frame L150 is authenticated.

Then, the authentication information server 110 transmits a frame L160 including the time authentication information to the user device 130 (S-104). At this time, the authentication information server 110 encrypts the time authentication information and stores the encrypted time authentication information in the frame L160 so that the time authentication information is not falsified by the user. Any encryption method can be used. For example, a method can be used in which information is embedded like a watermark in the original authentication object data.

When the user device 130 receives the frame L160, the user device 130 generates a frame based on the frame L160 and transmits the generated frame to the contents server 100 that uses the time authentication information (S-105). Here, the frame transmitted to the contents server 100 includes the time authentication information included in the frame L160 and information added as needed.

When the contents server 100 receives the frame from the user device 130, the contents server 100 performs processing for providing a service to the user device 130, such as data generation time authentication or transaction sequence management of electronic commerce on the basis of the time authentication information included in the received frame (S-106).

The frame L140, the frame L150, and the frame L160 are collectively referred to as an authentication request frame in the description below. Although the contents server 100 and the authentication information server 110 shown in FIGS. 1 and 2 are different devices connected through the transmission network 10, one device may have a plurality of functions corresponding to these servers.

The aforementioned authentication information server 110 transmits the frame L160 including the time authentication information to the user device 130 and the user device 130 transmits the frame including the information added as needed and the information included in the frame L160 to the contents server 100.

However, if the user device 130 need not add information other than the information included in the frame L160 to the information transmitted to the contents server 100, the authentication information server 110 may directly transmit the frame L160 to the contents server 100. In this case, when the contents server 100 receives the frame L160 from the authentication information server 110, the contents server 100 provides a service to the user device 130 on the basis of the frame L160.

The authentication information server 110 authenticates the time when the network terminating device 120 receives the authentication request frame (the request time T) by the processes shown in FIGS. 1 and 2, so that it is possible to cancel an error of the authentication time due to the delay time in which the frame passes through the transmission network 10. Thereby, the authentication information server 110 can authenticate a time sufficiently close to the time which the user truly requests to be authenticated.

Figure 3:
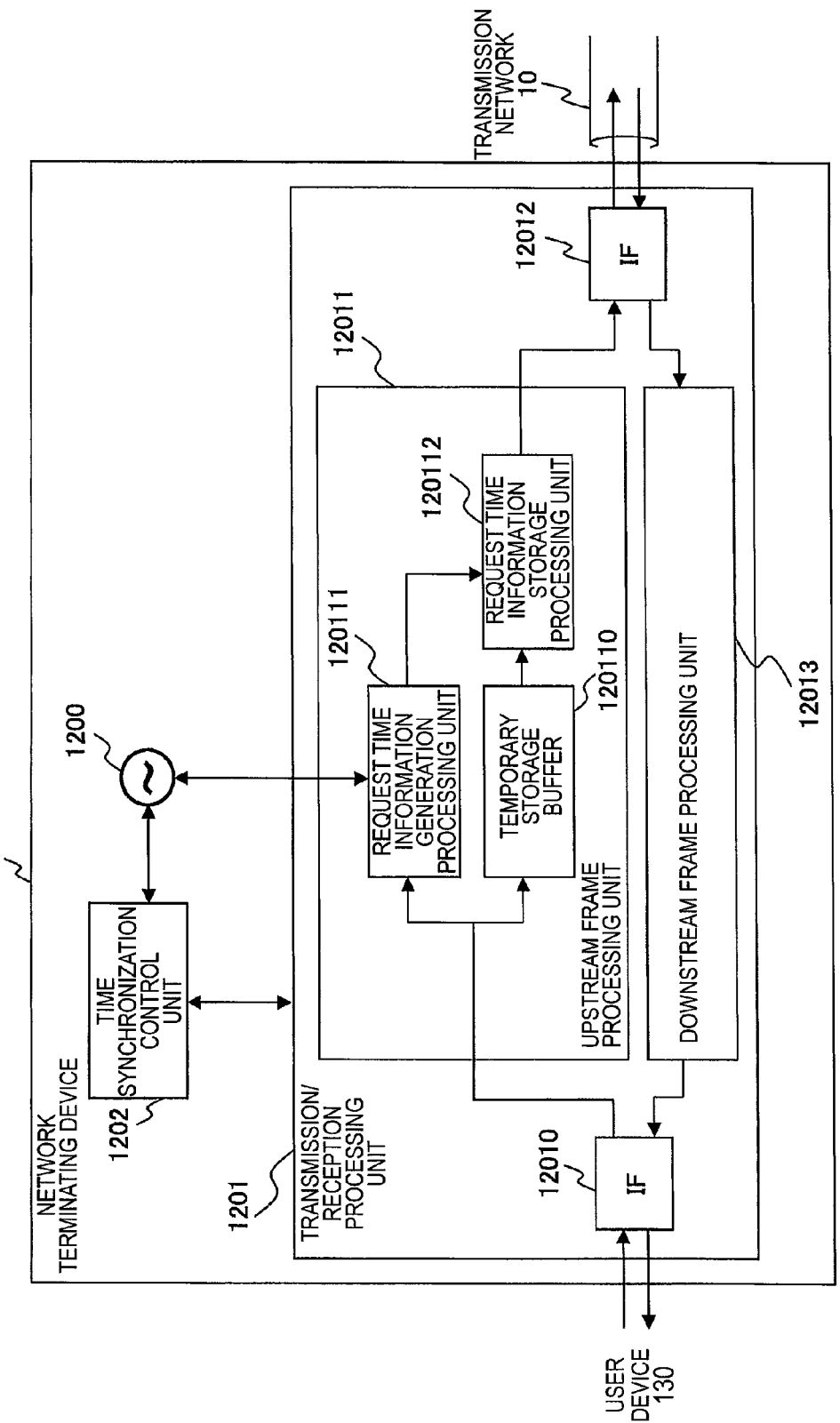
FIG. 3 is a block diagram illustrating functions of a network terminating device of the first embodiment.

FIG. 3 is a block diagram illustrating functions of the network terminating device 120 of the first embodiment.

The network terminating device 120 shown in FIG. 3 has functions to implement the processes described in FIGS. 1 and 2. The network terminating device 120 includes the internal clock 1200, a transmission/reception processing unit 1201, and a time synchronization control unit 1202 as functional units.

The network terminating device 120 is a computer including a processor, a memory, and a network interface. The network terminating device 120 includes a plurality of physical devices such as, for example, integrated circuits to implement a plurality of functional units. The network terminating device 120 may include one physical device to implement a plurality of functional units.

The functional units included in the network terminating device 120 may be implemented by a program being executed in the memory by the processor included in the network terminating device 120.

The time synchronization control unit 1202 controls the time synchronization of the internal clock 1200.

The transmission/reception processing unit 1201 includes an interface (IF) 12010, an interface (IF) 12012, an upstream frame processing unit 12011, and a downstream frame processing unit 12013 and performs transmission/reception processing.

The IF 12010 is a network interface for receiving a frame transmitted from the user device 130 and transmitting a frame to the user device 130.

The IF 12012 is a network interface for receiving a frame transmitted from the transmission network 10 and transmitting a frame to the transmission network 10. Further, the IF 12012 receives a request for setting change in the network terminating device 120 transmitted from an administrator of a telecommunications company or the like through the transmission network 10.

For example, the administrator may transmit a request for updating the internal clock 1200 to the time synchronization control unit 1202 through the transmission network 10 and the IF 12012. The time synchronization control unit 1202 may synchronize the internal clock 1200 with the time synchronization reference clock 11 according to the request from the administrator.

The downstream frame processing unit 12013 performs predetermined processing on a frame transmitted from the transmission network 10 and transmitted to the user device 130.

The upstream frame processing unit 12011 stores the request time T in an upstream frame transmitted from the user device 130 and transmitted to the transmission network 10. The upstream frame processing unit 12011 includes a request time information generation processing unit 120111, a temporary storage buffer 120110, and a request time information storage processing unit 120112 as functional units.

The request time information generation processing unit 120111 generates the request time T. The temporary storage buffer 120110 holds an upstream frame received by the IF 12010. The request time information storage processing unit 120112 stores the request time T in the upstream frame.

A feature of the processing of the network terminating device 120 of the present embodiment is a point that the request time T is stored in the upstream frame when the upstream frame is transmitted. This processing will be described below.

When the frame L140 transmitted from the user device 130 is received through the IF 12010, the temporary storage buffer 120110 holds the frame L140 and the request time information generation processing unit 120111 refers to the internal clock 1200. The request time information generation processing unit 120111 acquires a time when the request time information generation processing unit 120111 refers to the internal clock 1200 as the request time T from the internal clock 1200 and generates request time information to store the acquired request time T in a frame.

The request time information storage processing unit 120112 stores the request time information generated by the request time information generation processing unit 120111 in the upstream frame held by the temporary storage buffer 120110. Then, the request time information storage processing unit 120112 transmits the upstream frame in which the request time information is stored to the transmission network 10 as the frame L150 through the IF 12012.

The details of the processing of the network terminating device 120 will be described with reference to FIGS. 4 and 5.

Figure 4:
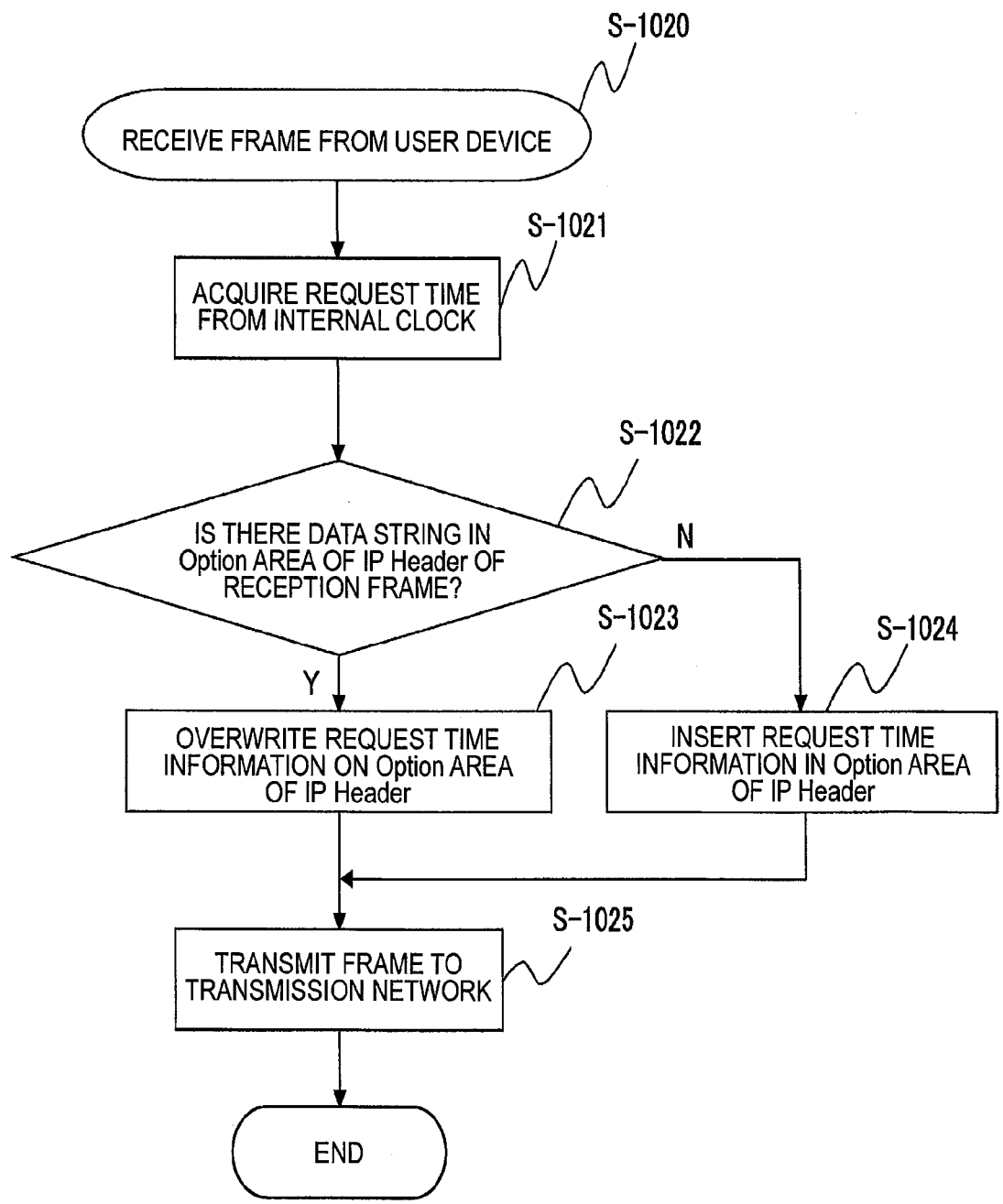
FIG. 4 is a flowchart illustrating an example of processing on an upstream frame by the network terminating device of the first embodiment.

FIG. 4 is a flowchart illustrating an example of processing on an upstream frame by the network terminating device 120 of the first embodiment.

In the first embodiment, the frame L140 is an authentication request frame transmitted from the user device 130. The frame L140 is an Ethernet (registered trademark, the same shall apply hereinafter) frame and the Ethernet frame includes an IP packet which is widely used in general data transmission through the transmission network 10.

The request time information storage processing unit 120112 stores the request time information in an Option area included in an IP Header (hereinafter also referred to as an IP header) of the frame L140.

The format of an IP packet including the Option area is a format of a known technique such as IPv4 defined by standards of standardization organization IETF (The Internet Engineering Task Force), for example, RFC791.

As shown in FIG. 4, when the IF 12010 of the network terminating device 120 receives the frame L140 transmitted from the user device 130 (S-1020), the request time information generation processing unit 120111 acquires the request time T from the internal clock 1200 (S-1021). The request time T indicates a time when the network terminating device 120 receives the frame L140.

The internal clock 1200 of the network terminating device 120 may have a function to be able to output a time in microseconds in order to output the aforementioned request time T.

Alternatively, the internal clock 1200 may output a time in seconds or milliseconds and the request time information generation processing unit 120111 may calculate a time in microseconds by using the outputted time and a clock count of a hardware clock (which generally operates in a range from tens of megahertz to hundreds of megahertz) included in the network terminating device 120.

If the method in which the request time information generation processing unit 120111 acquires the request time T is the latter method, the operation frequency of the hardware clock included in each network terminating device 120 is synchronized with the time synchronization reference clock 11 by using a known technique such as IEEE 1588v2.

After S-1021, if the request time is inputted into the request time information storage processing unit 120112 from the request time information generation processing unit 120111, the request time information storage processing unit 120112 acquires the frame L140 from the temporary storage buffer 120110 and determines whether or not a data string is included in the Option area of the IP header of the acquired frame L140 (S-1022).

If a data string is included in the Option area of the IP header of the frame L140 (in the case of "Y" shown in FIG. 4), the request time information storage processing unit 120112 overwrites the inputted request time information to the Option area of the IP header of the frame L140 (S-1023).

If a data string is not included in the Option area of the IP header of the frame L140 (in the case of "N" shown in FIG. 4), the request time information storage processing unit 120112 inserts the inputted request time information to the Option area of the IP header (S-1024).

In S-1023 and S-1024, the Option area is updated by the request time information and thereafter a value included in the frame L140 is converted as needed, so that the frame L140 is converted into the frame L150.

After S-1023 or S-1024, the IF 12012 transmits the frame L150 generated by S-1023 or S-1024 to the transmission network 10 (S-1025).

The aforementioned processing assumes that the user device 130 does not store information in the Option area of the IP header. In a system that uses the Option area of the IP header for a purpose different from that of the present embodiment, if the network terminating device 120 receives a frame in which information is stored in the Option area of the IP header by the user device 130, the request time information storage processing unit 120112 may store an identifier of the request time information and the request time information in addition to an existing data string. The authentication information server 110 may extract the request time information included in the Option area of the IP header by using the identifier of the request time information.

Figure 5:
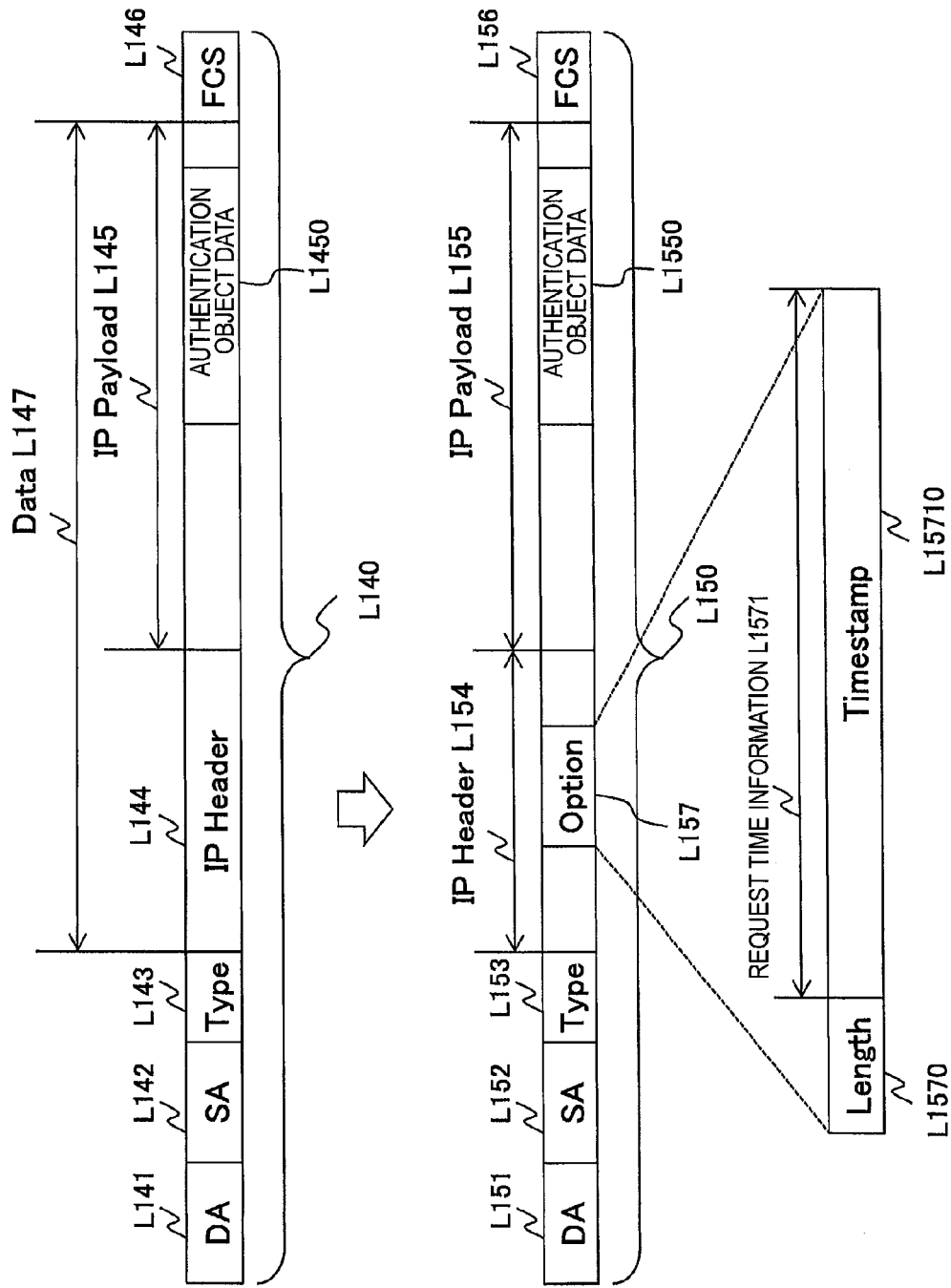
FIG. 5 is an illustration showing examples of a frame format of a frame inputted into the network terminating device of the first embodiment and a frame format of a frame outputted from the network terminating device.

FIG. 5 is an illustration showing examples of a frame format of the frame L140 inputted into the network terminating device 120 of the first embodiment and a frame format of the frame L150 outputted from the network terminating device 120.

The frame formats of the frame L140 and the frame L150 will be described in further detail with reference to FIG. 5. As described above, the frame L140 and the frame L150 of the first embodiment are normal Ethernet frames and include an IP header and an IP Payload (hereinafter also referred to as an IP payload).

The frame L140 includes DA (L141), SA (L142), Type (L143), Data (L147), and FCS (L146) as defined by IEEE 802.3. The DA (L141) indicates a destination address and the SA (L142) indicates a transmission source address.

When an Ethernet frame contains an IPv4 packet, the Type (L143) is "0x800" and the Data (L147) includes an IP header L144 and an IP payload L145.

Authentication object data L1450 in the first embodiment is included in the IP payload L145. The authentication object data L1450 includes data whose time is authenticated. Although a configuration of the authentication object data L1450 is not shown in the drawings, the authentication object data L1450 includes, for example, Service ID indicating a service that uses time authentication, User ID for identifying a user, and data to be authenticated. The authentication object data included in the authentication object data L1450 is all data to be authenticated or a hash value calculated from a bit string of data to be authenticated.

The frame L150 is a frame in which request time information L1571 is stored in the frame L140 by the network terminating device 120.

On the other hand, an IP header L154 of the frame L150 is the IP header L144 in which an Option area L157 including the request time information L1571 is stored. The Option area L157 includes Length L1570 and the request time information L1571.

The Length L1570 is an area indicating the length of the Option area L157. The request time information L1571 in the first embodiment includes Timestamp L15710. The Timestamp L15710 is an area indicating the request time T. The Timestamp L15710 includes a data area of eight bytes formed by adding padding to a total of seven bytes including ten bits representing year, four bits representing month, five bits representing day, five bits representing hour, six bits representing minute, and 26 bits representing time units from second to microsecond.

Although DA (L151) and SA (L152) of the frame L150 correspond to the DA (L141) and the SA (L142), values of the DA (L151) and the SA (L152) are changed as needed in the upstream frame processing unit 12011 of the network terminating device 120.

An IP payload L155 includes the authentication object data L1450 as authentication object data L1550. The IP header L154 is edited, so that a checksum value related to the IP payload L115 is recalculated as needed.

FCS (L156) includes a result obtained by recalculating the checksum value of the frame L150 as an Ethernet frame.

The frame formats illustrated in FIG. 5 are examples and the frame formats of the present embodiment are not limited to specific frame formats. Further, as a method for storing the request time information, in addition to the method for storing the request time information in the Option area L157 of the IP header L154, for example, a method may be used in which a new Type value to be stored in the Type (L143) is defined and the request time information is stored in part of header indicated by the new Type value.

By using the processing and configurations illustrated in FIGS. 3 to 5, the network terminating device 120 can store a correct request time T based on the internal clock 1200 accurately synchronized in the transmission network 10 in the frame L140 transmitted from the user device 130. Further, the processing illustrated in FIG. 4 is performed by the network terminating device 120 and is performed independently from the information included in the frame L140, so that it is possible to prevent the frame L140 from being falsely modified by a user.

Figure 6:
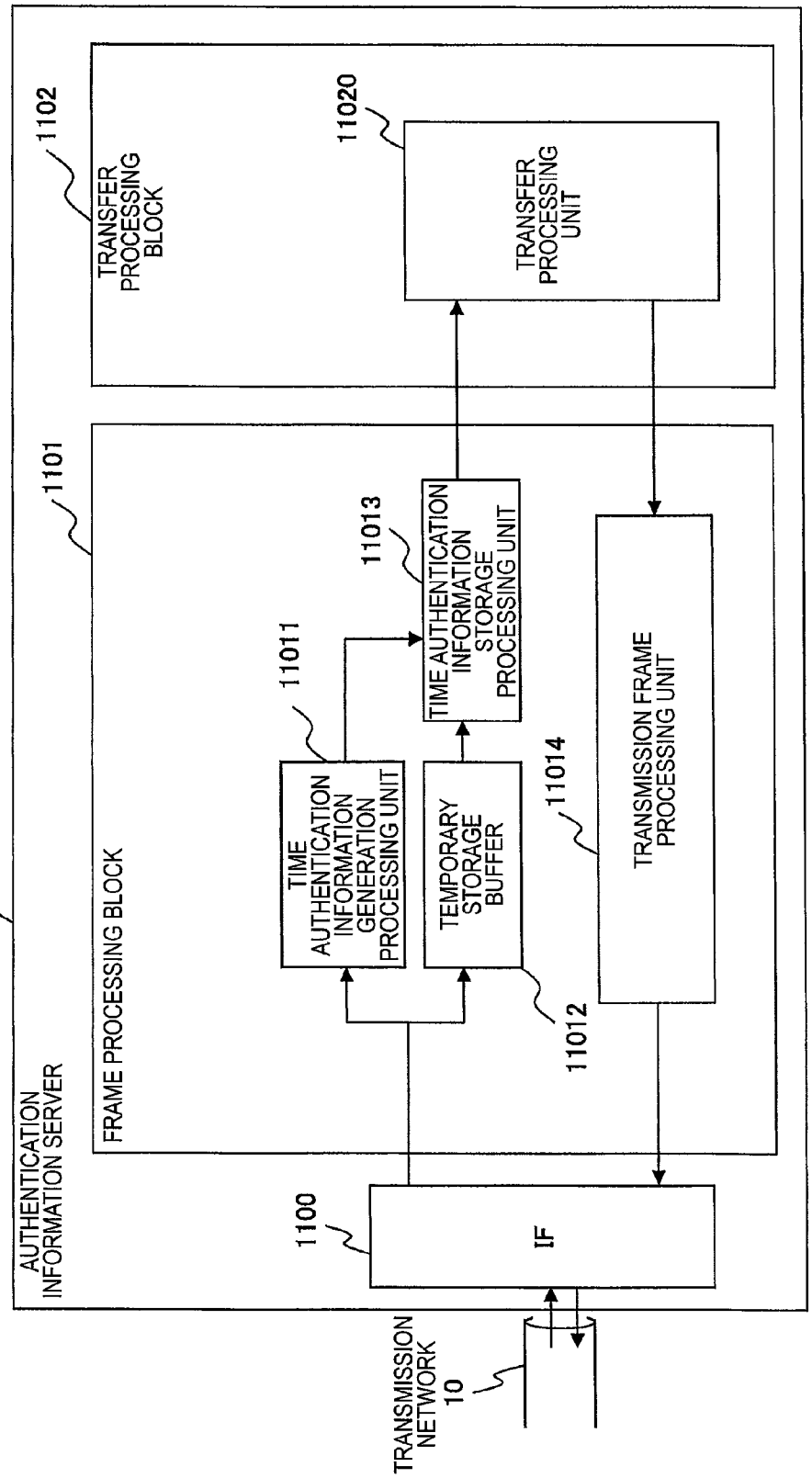
FIG. 6 is a block diagram illustrating an example of functions of an authentication information server of the first embodiment.

FIG. 6 is a block diagram illustrating an example of functions of the authentication information server 110 of the first embodiment.

The authentication information server 110 shown in FIG. 6 has functions to implement the processes described in FIGS. 1 and 2. The authentication information server 110 includes an interface (IF) 1100, a frame processing block 1101, and a transfer processing block 1102.

The authentication information server 110 is a computer including a processor, a memory, and a network interface and includes a plurality of physical devices to implement each of a plurality of functional units. The authentication information server 110 may include one physical device to implement a plurality of functional units.

The functional units included in the authentication information server 110 may be implemented by a program being executed in the memory by the processor included in the authentication information server 110.

The IF 1100 is an interface for receiving data transmitted from the transmission network 10 and transmitting data to the transmission network 10. The frame processing block 1101 generates a frame in which time authentication information is stored. The frame processing block 1101 includes a time authentication information generation processing unit 11011, a temporary storage buffer 11012, a time authentication information storage processing unit 11013, and a transmission frame processing unit 11014.

The transfer processing block 1102 transfers a received frame to a transmission destination. The transfer processing block 1102 includes a transfer processing unit 11020.

A feature of the authentication information server 110 of the first embodiment is processing for generating the time authentication information based on the request time information and the authentication object data extracted from the frame L150 when receiving the frame L150 transmitted from the transmission network 10 and generating a frame in which the time authentication information is stored. This processing will be described below.

When the authentication information server 110 receives the frame L150 through the IF 1100, the temporary storage buffer 11012 holds the frame L150 and the time authentication information generation processing unit 11011 generates the time authentication information based on the request time information and the authentication object data extracted from the frame L150. Then, the time authentication information storage processing unit 11013 generates the frame L160 including the time authentication information based on the frame L150.

Here, the time authentication information is data obtained by encrypting the request time information and the authentication object data and is data that can be decoded into the original information.

The frame L160 including the time authentication information is transmitted to the transmission network 10 through the transfer processing unit 11020 of the transfer processing block 1102, the transmission frame processing unit 11014 of the frame processing block 1101, and the IF 1100.

When transmitting the frame L160 including the time authentication information to the user device 130, the authentication information server 110 only transmits the frame L160 to a transmission source IP address included in the SA (L152) of the frame L150, so that the transfer processing unit 11020 and the transmission frame processing unit 11014 only edit the IP header L154 and recalculate a checksum value of the FCS (L156) or the like.

On the other hand, as described above, when transmitting the frame L160 including the time authentication information to a contents server 100, the transfer processing unit 11020 determines a contents server 100 to be a destination based on the authentication object data extracted from the frame L150 and transfers the frame L160 to the determined contents server 100.

The details of the processing of the authentication information server 110 will be described with reference to FIGS. 7 and 8.

Figure 7:
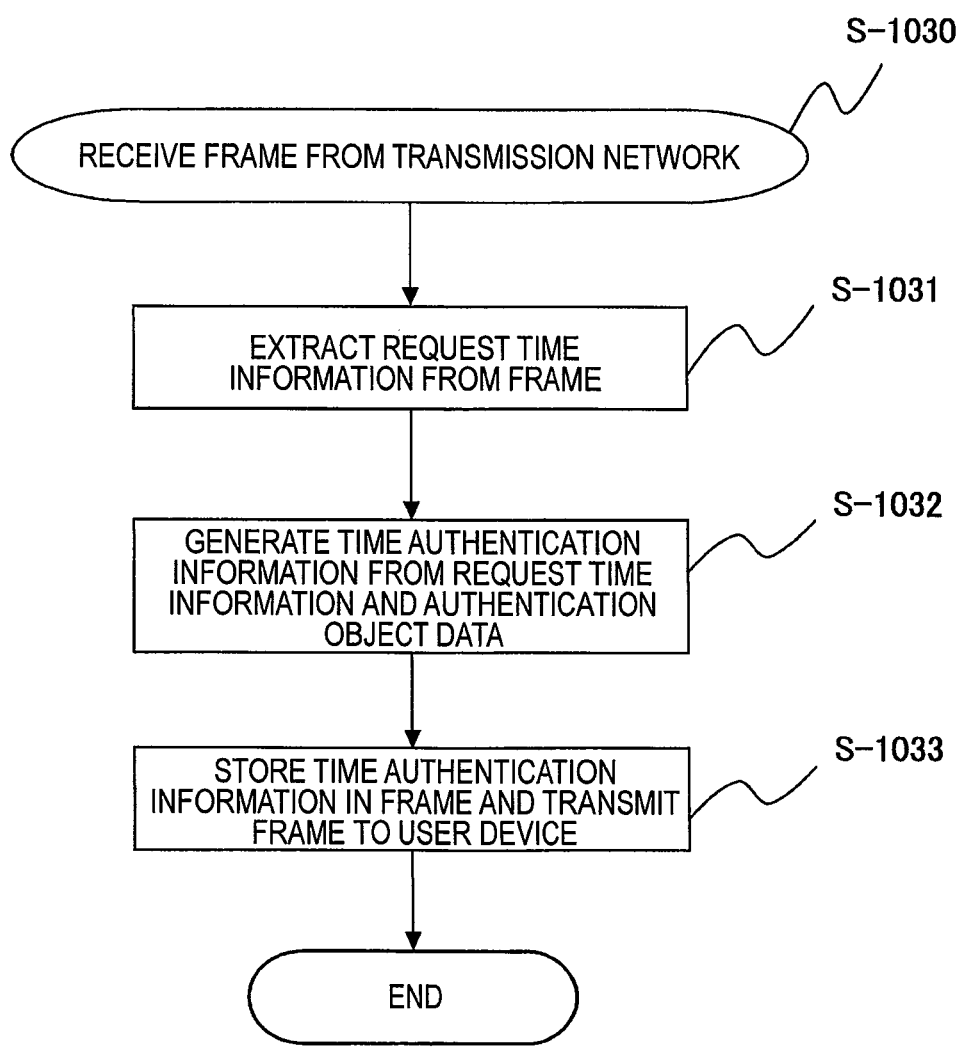
FIG. 7 is a flowchart illustrating processing on a frame by the authentication information server of the first embodiment.

FIG. 7 is a flowchart illustrating the processing on a frame by the authentication information server 110 of the first embodiment.

Like other frames, the frame L160 including the time authentication information in the first embodiment is an Ethernet frame that includes an IP packet and the time authentication information is stored in an IP payload L165 of the frame L160.

When the IF 1100 of the authentication information server 110 receives the frame L150 from the transmission network 10 (S-1030), the time authentication information generation processing unit 11011 extracts the request time information and the authentication object data from the Timestamp L15710 and the authentication object data L1550 of the frame L150 (S-1031).

After S-1031, the time authentication information generation processing unit 11011 generates the time authentication information by encrypting the extracted request time information and authentication object data (S-1032). The time authentication information generation processing unit 11011 stores the generated time authentication information in the IP payload L165 of the frame L160 as time authentication information L1650. Then, the time authentication information generation processing unit 11011 transmits the frame L160 to the user device 130 (S-1033).

Figure 8:
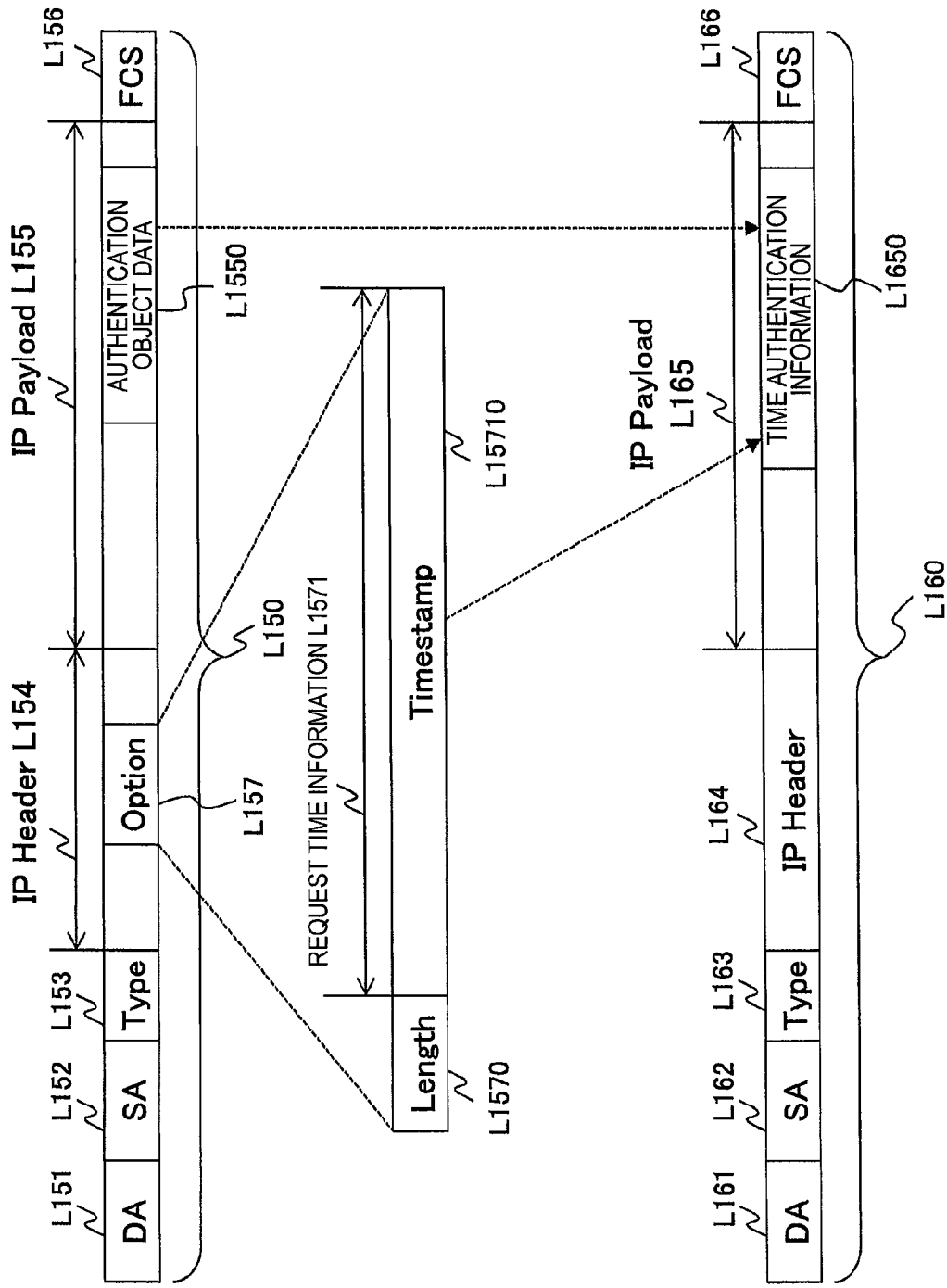
FIG. 8 is an illustration showing examples of a frame format of a frame inputted into the authentication information server of the first embodiment and a frame format of a frame outputted from the authentication information server.

FIG. 8 is an illustration showing examples of a frame format of the frame L150 inputted into the authentication information server 110 of the first embodiment and a frame format of the frame L160 outputted from the authentication information server 110.

Here, the frame L150 received by the authentication information server 110 is the same as the frame L150 transmitted from the network terminating device 120 in the first embodiment for simplicity of the description. However, if there is a communication device through which the frame L150 passes when the frame L150 is transmitted in the transmission network 10, for example, the DA (L151), the SA (L152), and the FCS (L156) of the frame L150 may be updated as needed. If the request time information L1571 and the authentication object data L1550 are held in the frame L150 and the checksum value included in the frame L150 is normal, the aforementioned processing of the first embodiment is performed.

The frame L160 is generated based on the frame L150 by the authentication information server 110. An IP header L164 of the frame L160 is a header formed by removing the request time information L1571 or the Option area L157 from the IP header L154. The IP header L164 includes data in which transmission source IP address, transmission destination IP address, and the like included in the IP header L154 are updated as needed.

The IP payload L165 includes the aforementioned time authentication information as the time authentication information L1650. The checksum value of the IP payload L165 is recalculated.

The DA (L151) and the SA (L152) of the frame L150 are updated to DA (L161) and SA (L162) of the frame L160 by the authentication information server 110 as needed. Type (L163) is the same as Type (L153). FCS (L166) includes a checksum value related to the frame L160 calculated as an Ethernet frame.

By using the processing and configurations illustrated in FIGS. 6 to 8, the authentication information server 110 can generate the frame L160 based on the frame L150 transmitted from the transmission network 10 and transmit the generated frame L160 to the user device 130. The authentication information server 110 can store the time authentication information L1650 generated by the request time information L1571 and the authentication object data L1550 in the frame L160.

By generating the time authentication information including the authentication object data transmitted from the network terminating device 120, the authentication information server 110 can transmit the time authentication information to the contents server 100 that provides a service to the user device 130.

Figure 9:
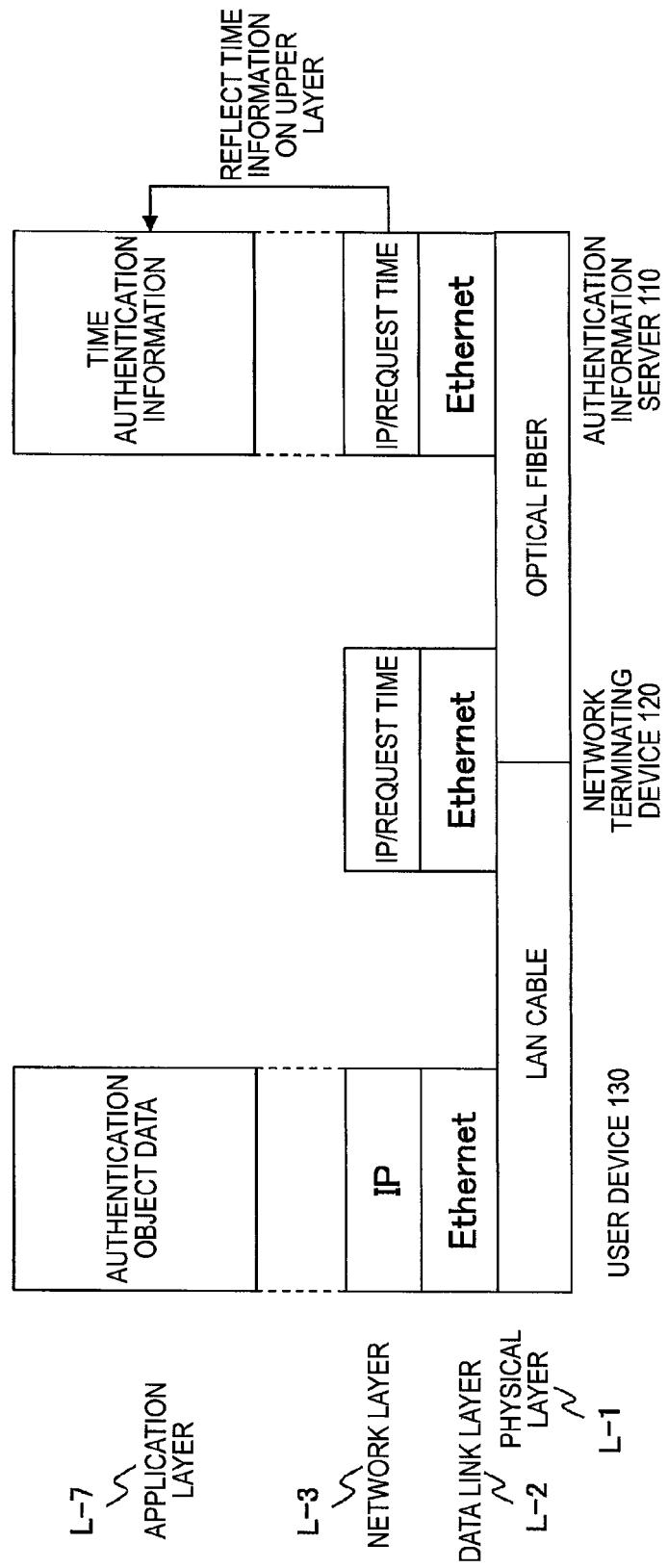
FIG. 9 is an illustration showing a protocol stack of the first embodiment.

FIG. 9 is an illustration showing an example of a protocol stack of the first embodiment.

FIG. 9 illustrates a protocol stack illustrating a layer of a network protocol used by the user device 130, the network terminating device 120, and the authentication information server 110 of the first embodiment. The protocol stack illustrated FIG. 9 includes a physical layer L-1, a data link layer L-2, a network layer L-3, and an application layer L-7 based on an OSI reference model.

For example, each device in the first embodiment uses IP in the network layer L-3 and uses Ethernet in the data link layer L-2. The request time information is stored in a frame as information in the IP header corresponding to the network layer L-3. The authentication object data and the time authentication information are stored in a frame as data of the application layer L-7 which is an upper layer in the protocol stack.

Although the request time information is stored in the IP header in the above description, the request time information may be stored in an area of a frame processed in the data link layer L-2. Specifically, the request time information may be stored in an Ethernet header. When the request time information is stored in the Ethernet header, the "IP header" in the description of the above processing is replaced by the "Ethernet header".

As shown in FIGS. 6 to 8, the authentication information server 110 generates the time authentication information to be processed in the application layer L-7 by using the request time information to be processed in the network layer L-3. As described above, a feature of the authentication information server 110 of the first embodiment is that the authentication information server 110 performs processing for storing information in different layers.

Thereby, the network terminating device 120 need not store the request time information in the application layer L-7, so that the network terminating device 120 need not recognize the application layer L-7 included in a frame.

In the first embodiment, for example, a LAN cable is used in the physical layer L-1 in a transmission path in a user site between the user device 130 and the network terminating device 120, and an optical fiber is used in the physical layer L-1 in the transmission network 10 between the network terminating device 120 and the authentication information server 110. In the first embodiment, processing in layers higher than the network layer L-3 and lower than the application layer L-7 is not particularly defined. However, for example, a layer in which retransmission control or the like is performed by using TCP (Transmission Control Protocol) may be included.

Although the network terminating device 120 and the user device 130 are connected by wired communication in the first embodiment, the network terminating device 120 and the user device 130 may be connected by wireless communication in the first embodiment. For example, the network terminating device 120 may be a base station and the user device 130 may be a mobile terminal.

According to the first embodiment, when authenticating a time when the user device 130 generates or processes a frame, the authentication information server 110 adds a time (request time T) when the network terminating device 120 connected to the user device 130 receives the frame to the time authentication information created by the authentication information server 110. Thereby, the authentication information server 110 can authenticate a time sufficiently close to the time which the user truly requests to be authenticated. Further, the authentication information server 110 can authenticate a time that is not affected by delay time in the transmission network 10.

In a time authentication service whose purpose is to prove existence of data, not only the accuracy of the time authentication is improved (a difference from an absolute time requested by a user is reduced), but also a time when each user requests transaction in a service such as electronic commerce can be known and a transaction sequence management based on the time is performed, so that it is possible to eliminate inequality between users.

According to the first embodiment, in a series of time authentication operations, the network terminating device 120 acquires the request time T and the network terminating device 120 is a device different from the user device 130. Therefore, it is possible to prevent a false behavior of a user, such as behavior of the user to update the internal clock 1200 and behavior of the user to update the request time T.

Further, the authentication information server 110 of the first embodiment does not compound frames transmitted from the network terminating device 120, so that the transmission network system of the first embodiment need not combine the network terminating device 120 and the authentication information server 110 to install them. Thus, it is possible to prevent increase of the cost due to increase of the number of the network terminating devices 120.

Second Embodiment

In the second embodiment, a system will be described in which an authentication information server rejects reception of a false authentication request on the basis of management information of a network terminating device managed by a network management system and a time of an internal clock in a transmission network system which performs time authentication based on a request time in a network terminating device installed in a user site when time authentication of data generated or updated by a user is performed through a transmission network.

Figure 10:
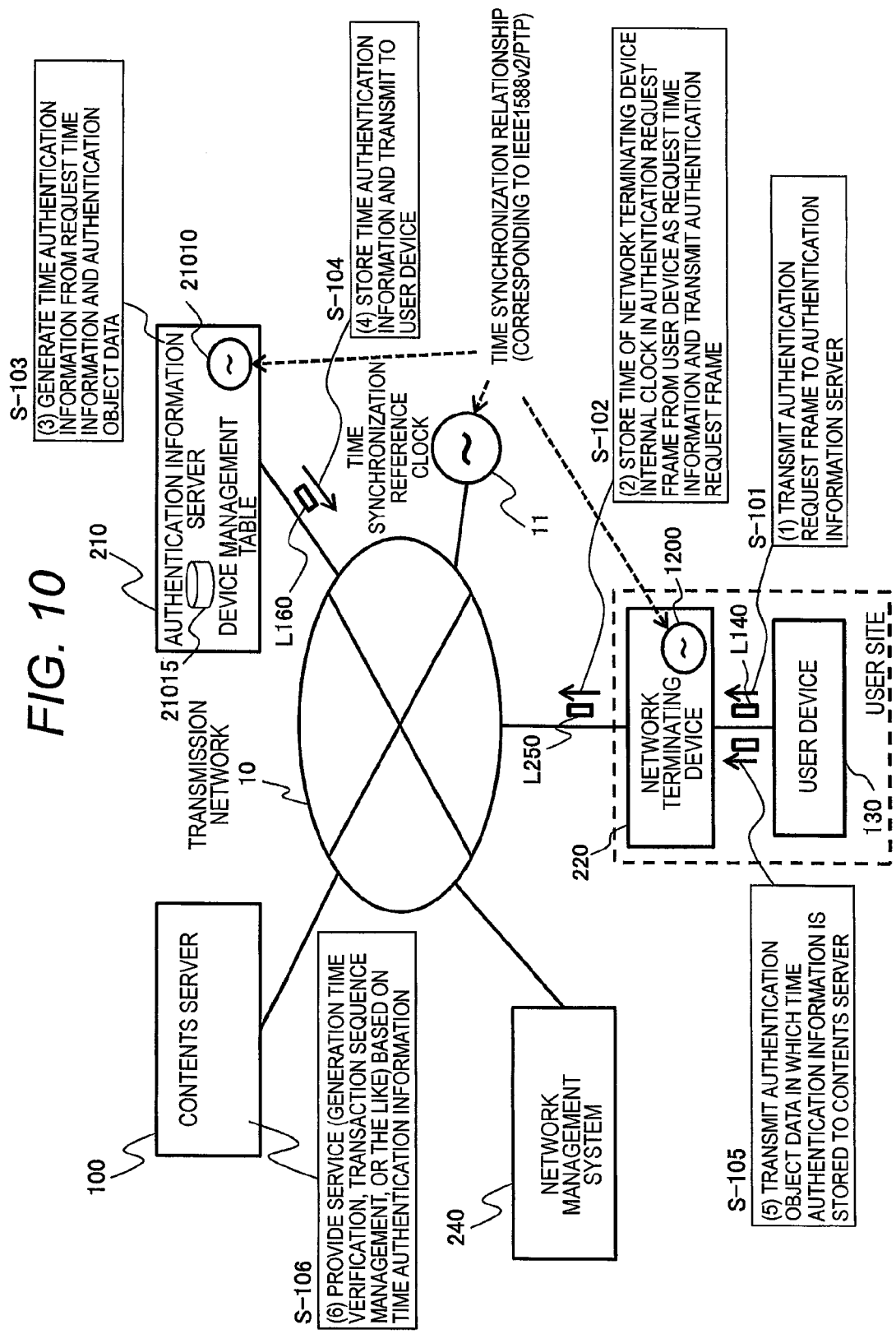
FIG. 10 is an illustration showing a configuration of a transmission network system of a second embodiment.

FIG. 10 is an illustration showing a configuration of the transmission network system of the second embodiment.

In the same manner as the transmission network system of the first embodiment, the transmission network system of the second embodiment includes the contents server 100, the user device 130, the transmission network 10, and the time synchronization reference clock 11. The transmission network system of the second embodiment further includes an authentication information server 210 and a network terminating device 220 corresponding to the authentication information server 110 and the network terminating device 120 of the first embodiment. The transmission network system of the second embodiment further includes a network management system 240 differently from the transmission network system of the first embodiment.

The user device 130 transmits the frame L140 to the authentication information server 210 (S-101). The network terminating device 220 generates a frame L250 including the request time information on the basis of the frame L140 and transmits the generated frame L250 to the authentication information server 210 (S-102).

The frame L250 corresponds to the frame L150 of the first embodiment. The frame L250 includes information related to the network terminating device 220 differently from the frame L150 of the first embodiment.

The authentication information server 210 generates the time authentication information from the request time information and the authentication object data included in the frame L250 (S-103). The authentication information server 210 generates the frame L160 including the generated time authentication information on the basis of the frame L250 and transmits the generated frame L160 to the user device 130 or the contents server 100.

S-105 and S-106 shown in FIG. 10 are the same as S-105 and S-106 shown in FIG. 1.

The network terminating device 220 has a function similar to that of the network terminating device 120 of the first embodiment and the internal clock 1200 included in the network terminating device 220 is the same as the internal clock 1200 of the first embodiment. On the other hand, a difference between the network terminating device 220 and the network terminating device 120 is that the network terminating device 220 stores not only the request time T (Timestamp) but also System ID and Node ID in a frame as the request time information when storing the request time information in the frame. The System ID and the Node ID are information related to the network terminating device 220.

The authentication information server 210 has a function similar to that of the authentication information server 110 of the first embodiment. On the other hand, a difference between the authentication information server 210 and the authentication information server 110 is that the authentication information server 210 includes an internal clock 21010 and a device management table 21015.

The authentication information server 210 and the authentication information server 110 of the first embodiment are different from each other in a point described below. When the authentication information server 210 receives the frame L250 from the transmission network 10, the authentication information server 210 determines whether or not a difference between the request time T (Timestamp) included in the request time information of the frame L250 and a time of the internal clock 21010 is smaller than or equal to a certain value and determines whether or not the System ID and the Node ID indicated by the frame L250 are registered in the device management table 21015. Thereby, the authentication information server 210 determines validity of the frame L250.

The network management system 240 is a system that manages a communication device connected to the transmission network 10. The network management system 240 has a function to update the device management table 21015 of the authentication information server 210 when the number of the network terminating devices 220 increases or decreases according to change of the number of users who use the transmission network 10.

Further, the network management system 240 has a function to monitor whether or not the network terminating device 220 is normal. Further, the network management system 240 has a function to store information indicating a result of monitoring the network terminating device 220 in the device management table 21015 of the authentication information server 210.

The network management system 240 monitors the network terminating device 220 by a known technique such as an Ethernet OAM (operations, administration, and maintenance) function which is standardized as Recommendation Y.1731 by ITU-T (International Telecommunication Union-Telecommunication Standardization Sector).

The processing procedure of the time authentication in the second embodiment is similar to that in the first embodiment. However, the processing procedure of the time authentication in the second embodiment is different from that in the first embodiment in points that the network terminating device 220 stores not only the request time T (Timestamp) but also the System ID and the Node ID in a frame as the request time information and the authentication information server 210 determines validity of the authentication request frame. The details of the above processing will be described with reference to FIGS. 11 to 15.

Figure 11:
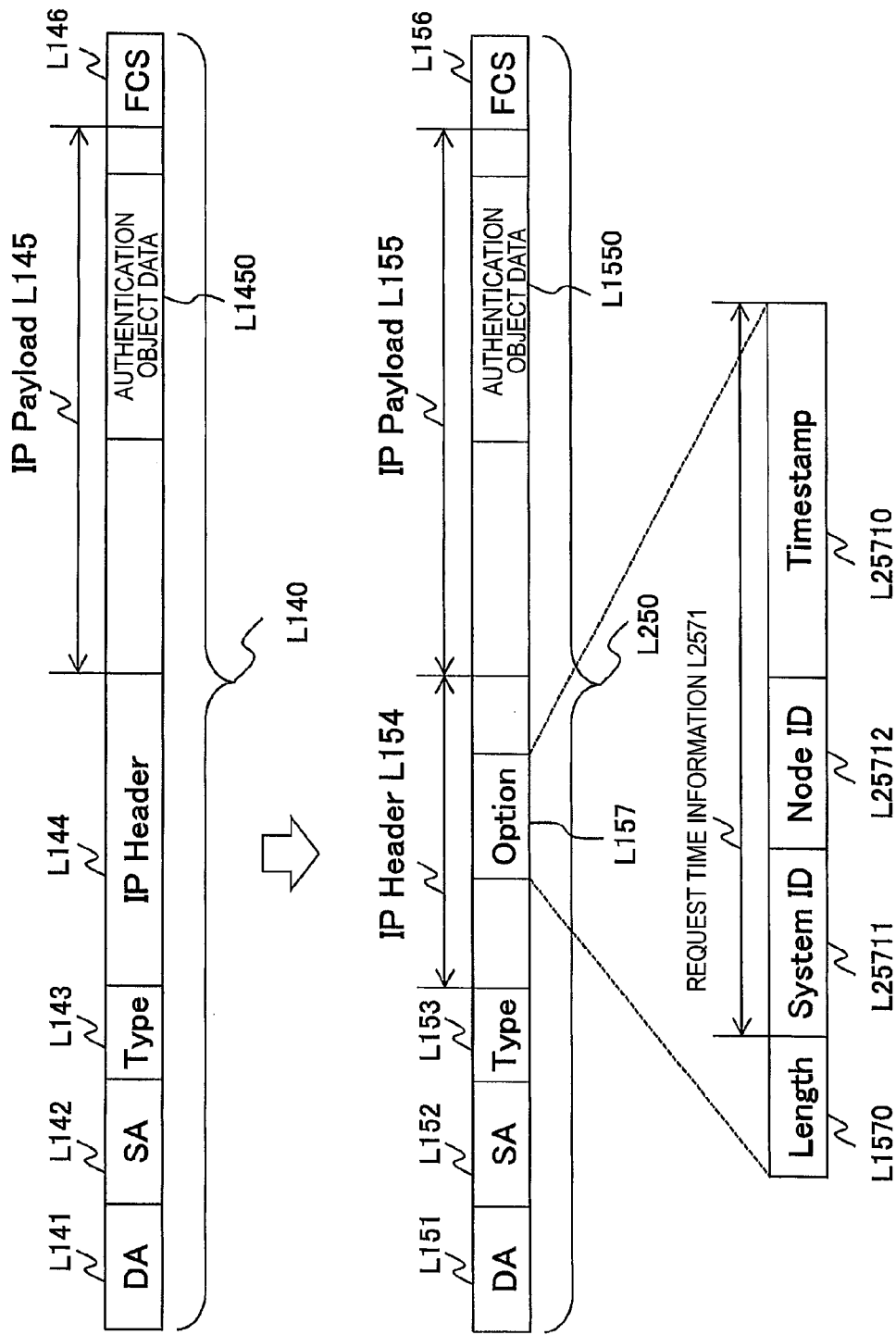
FIG. 11 is an illustration showing examples of a frame format of a frame inputted into the network terminating device of the second embodiment and a frame format of a frame outputted from the network terminating device.

FIG. 11 is an illustration showing examples of frame format of the frame L140 inputted into the network terminating device 220 of the second embodiment and a frame format of the frame L250 outputted from the network terminating device 220.

Like the frame L150 in the first embodiment, the frame L250 in the second embodiment is an Ethernet frame including an IP packet that is widely used to transmit data through the transmission network 10 and the request time information is stored as request time information L2571 in the Option area L157 included in the IP Header L154 of the frame L250.

However, the frame formats illustrated in FIG. 11 are examples for showing feasibility and the frame formats used in the second embodiment are not limited to specific formats.

Further, the method for the network terminating device 220 of the second embodiment to store the request time information in the Option area L157 of the IP header L154 is an example. For example, the request time information may be stored in any area of a frame processed in the data link layer or the network layer in the OSI reference model.

The frame L140 of the second embodiment has the same frame format as that of the frame L140 of the first embodiment.

The frame L250 is the same as the frame L150 shown in the first embodiment. However, the Option area L157 of the second embodiment includes the request time information L2571 corresponding to the request time information L1571. The request time information L2571 includes Timestamp L25710, System ID (L25711), and Node ID (L25712).

The Timestamp L25710 is the same as the Timestamp L15710 of the first embodiment. The System ID (L25711) is an identifier uniquely indicating a telecommunications company that manages the network terminating device 220. The Node ID (L25712) is an identifier uniquely indicating the network terminating device 220 managed by the telecommunications company indicated by the System ID (L25711).

The upstream frame processing unit 12011 of the network terminating device 220 of the second embodiment holds an identifier uniquely indicating the telecommunications company and an identifier uniquely indicating the network terminating device 220 in advance. The request time information storage processing unit 120112 of the second embodiment generates the frame L250 by adding the Timestamp L25710, the System ID (L25711), and the Node ID (L25712), which include the request time T, the identifier uniquely indicating the telecommunications company, and the identifier uniquely indicating the network terminating device 220 respectively, to the frame L140 received from the user device 130.

In the transmission network system illustrated in FIG. 10, there is one telecommunications company that manages communication devices connected to the transmission network 10. On the other hand, in a general transmission network, there is a case in which an administrator of communication devices operates as a plurality of telecommunications companies. In this case, an identifier indicating an administrator of the network terminating device 220 in the transmission network 10 may be stored in the System ID (L25711).

Figure 12:
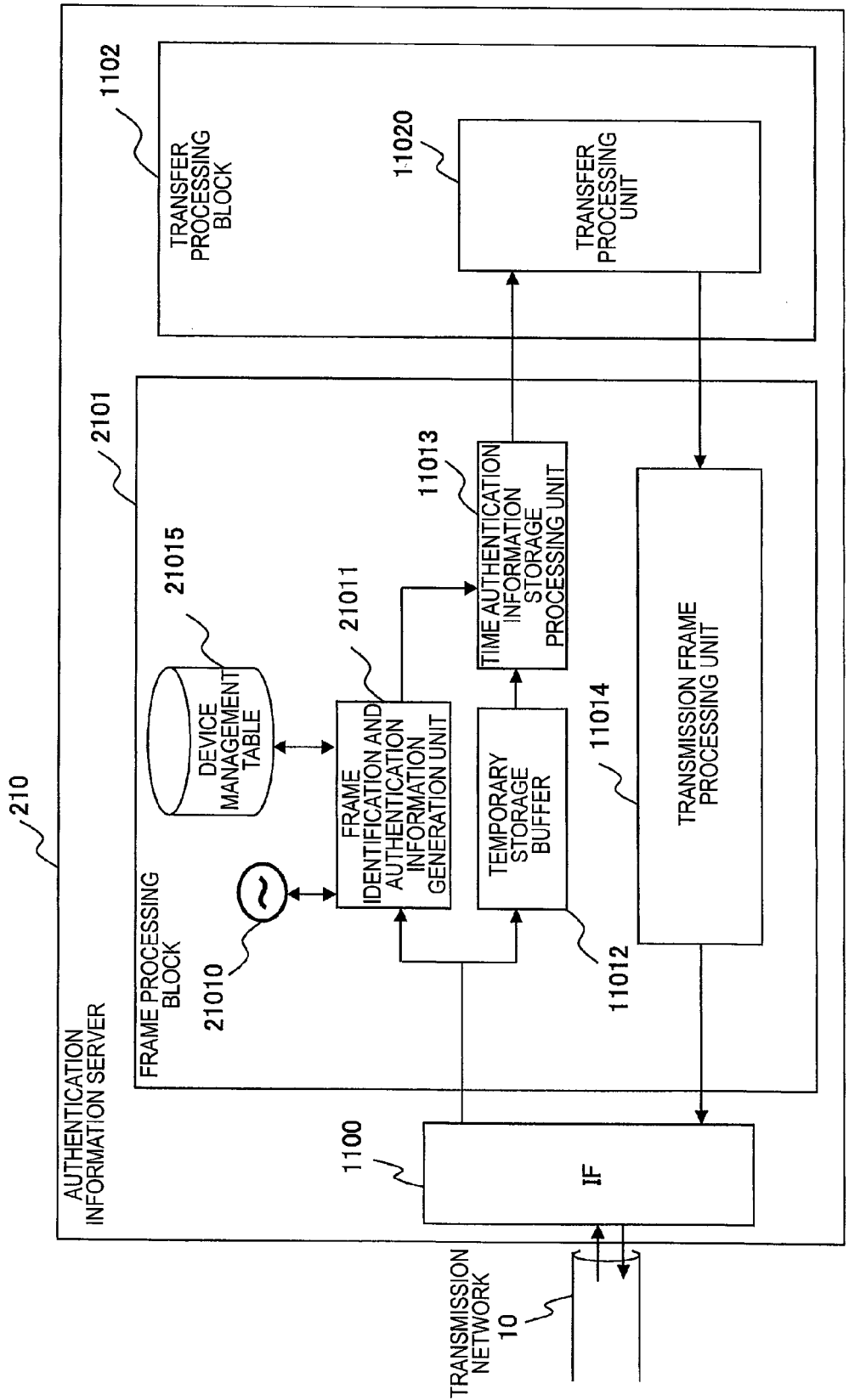
FIG. 12 is a block diagram illustrating an example of functions of an authentication information server of the second embodiment.

FIG. 12 is a block diagram illustrating an example of functions of the authentication information server 210 of the second embodiment.

The authentication information server 210 shown in FIG. 12 has functions to implement the processes shown in FIG. 10. The authentication information server 210 has functions similar to those of the authentication information server 110 of the first embodiment. In the same manner as the authentication information server 110, the authentication information server 210 includes the IF 1100 and the transfer processing block 1102 as functional units.

A difference between the authentication information server 110 and the authentication information server 210 is that the authentication information server 210 has a frame processing block 2101 corresponding to the frame processing block 1101 of the first embodiment and the frame processing block 2101 has the internal clock 21010 and the device management table 21015. Further, the frame processing block 2101 has a frame identification and authentication information generation unit 21011 corresponding to the time authentication information generation processing unit 11011 of the first embodiment.

Although the functional units included in the authentication information server 210 of the second embodiment are implemented by a physical device such as an integrated circuit, the functional units may be implemented by a program.

When receiving the frame L250 from the transmission network 10, the frame identification and authentication information generation unit 21011 extracts the request time T, the System ID, and the Node ID from the Timestamp L25710, the System ID (L25711), and the Node ID (L25712) of the frame L250. Then the frame identification and authentication information generation unit 21011 determines whether or not a difference between the extracted request time T and a time of the internal clock 21010 is smaller than or equal to a certain value.

Further, the frame identification and authentication information generation unit 21011 determines whether or not the System ID and the Node ID are registered in the device management table 21015. Thereby, the frame identification and authentication information generation unit 21011 checks validity of the received frame L250.

In the same manner as in the first embodiment, the authentication information server 210 includes the interface (IF) 1100 and the transfer processing block 1102. In the same manner as the frame processing block 1101 of the first embodiment, the frame processing block 2101 includes the temporary storage buffer 11012, the time authentication information storage processing unit 11013, and the transmission frame processing unit 11014.

Differently from the time authentication information generation processing unit 11011 of the first embodiment, the frame identification and authentication information generation unit 21011 performs processing of frame identification and validity determination described later in addition to processing of generating the time authentication information.

The details of the processing of the frame identification and authentication information generation unit 21011 will be described with reference to FIGS. 13, 14, and 15.

Figure 13:
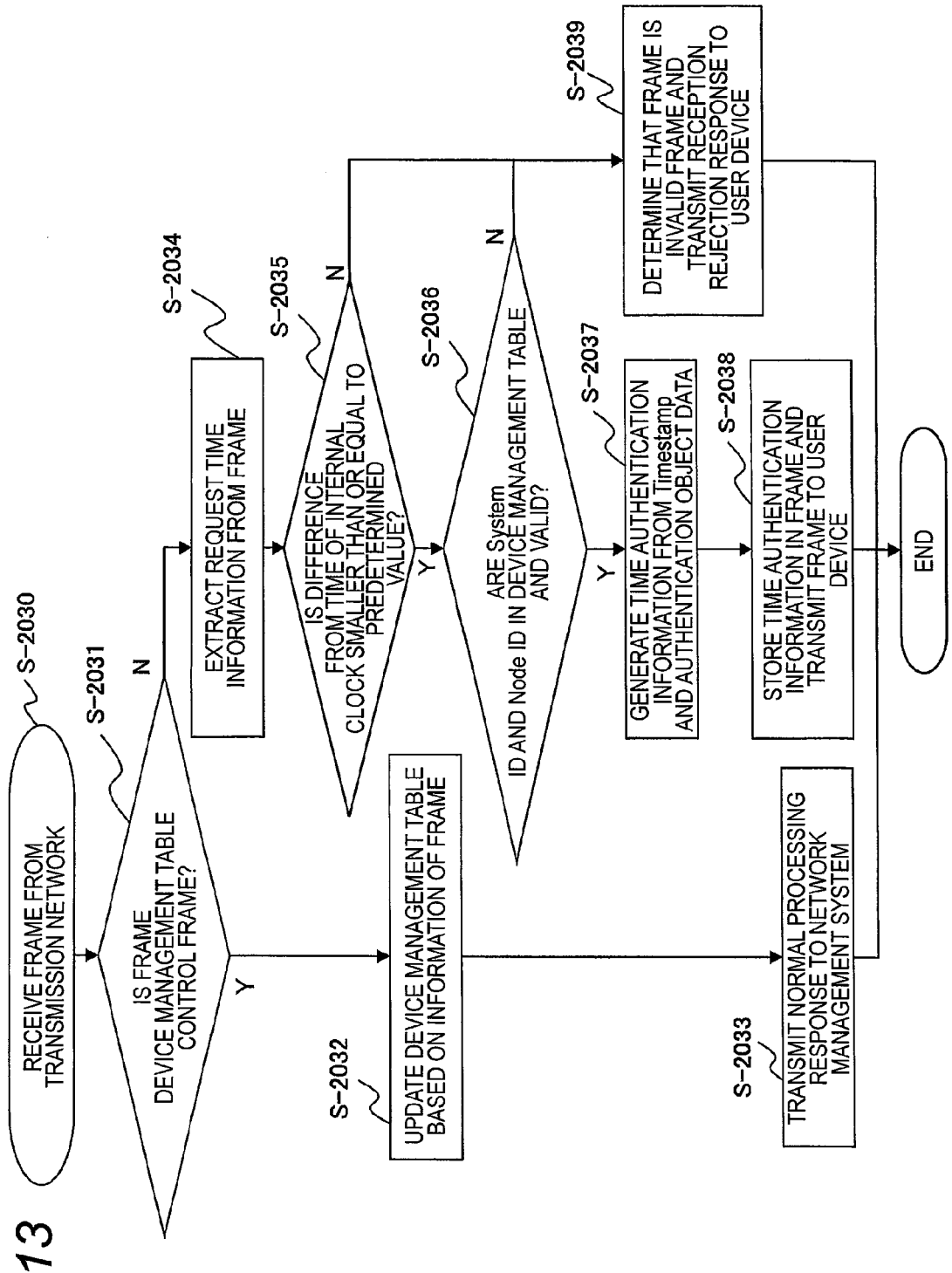
FIG. 13 is a flowchart illustrating an example of processing on a frame by the authentication information server of the second embodiment.

FIG. 13 is a flowchart illustrating an example of processing on a frame by the authentication information server 210 of the second embodiment.

Like other authentication request frames, the frame L160 in which the time authentication information is stored in the second embodiment is an Ethernet frame that includes an IP packet. The time authentication information is stored in the IP payload L165 of the frame L160.

As shown in FIG. 13, when the IF 1100 of the authentication information server 210 receives a frame from the transmission network 10 (S-2030), the frame identification and authentication information generation unit 21011 determines whether or not the received frame is a device management table control frame (S-2031).

Here, the device management table control frame is a frame generated by the network management system 240 and is a frame for updating the device management table 21015. For example, the device management table control frame includes an identifier indicating that this frame is a device management table control frame, an identifier uniquely indicating the authentication information server 210, an operation content performed on the device management table 21015 (adding entry, deleting entry, or changing Valid information), and information to be operated (System ID and Node ID).

In S-2031, if the received frame includes the identifier indicating that this frame is a device management table control frame, the frame identification and authentication information generation unit 21011 determines that the received frame is the device management table control frame.

If the received frame is the device management table control frame ("Y" in S-2031 shown in FIG. 13), the frame identification and authentication information generation unit 21011 updates the device management table 21015 based on the operation content and the information to be operated which are indicated by the received device management table control frame (S-2032).

For example, as information related to the network terminating device 220 to be added, the System ID and the Node ID that indicate the network terminating device 220 are included in the device management table control frame. Further, the device management table control frame includes information related to the network terminating device 220 which is determined to be abnormal, for example, as a result of monitoring performed by the network management system 240. In this case, the device management table control frame includes the System ID and the Node ID that indicate the network terminating device 220 and information indicating that the network terminating device 220 is abnormal (invalid).

After S-2032, the frame identification and authentication information generation unit 21011 transmits a normal processing response to the network management system 240 (S-2033).

If the received frame is not the device management table control frame ("N" in S-2031 shown in FIG. 13), the frame identification and authentication information generation unit 21011 recognizes that the received frame is the frame L250 of the authentication request frame and extracts the System ID, the Node ID, and the request time T from the request time information L2571 of the received frame L250 (S-2034).

After S-2034, the frame identification and authentication information generation unit 21011 determines whether or not a difference between the extracted request time T and a time of the internal clock 21010 is smaller than or equal to a predetermined value (S-2035).

The predetermined value in S-2035 is a value that is set in the authentication information server 210 in advance. For example, in the frame identification and authentication information generation unit 21011 of the authentication information server 210, using "1 second" as the predetermined value may be set in advance if the request time T is faster than the internal clock 21010, and using "0 second (not allowed)" as the predetermined value may be set in advance if the request time T is slower than the internal clock 21010.

If the difference between the request time T and the time of the internal clock 21010 is smaller than or equal to the predetermined value ("Y" in S-2035 shown in FIG. 13), a probability that the request time T is invalid is low and a probability that the received frame L250 is falsely transmitted is low. Therefore, the frame identification and authentication information generation unit 21011 determines whether or not the System ID and the Node ID extracted from the frame L250 are registered in the device management table 21015 and are valid (S-2036).

If the System ID and the Node ID extracted from the frame L250 are registered in the device management table 21015 and are valid ("Y" in S-2036 shown in FIG. 13), the frame L250 is the authentication request frame transmitted by a normal network terminating device 220 managed by the network management system 240 and a probability that the frame L250 is falsely transmitted is low. Therefore, the frame identification and authentication information generation unit 21011 extracts the authentication object data from the authentication object data L1550 of the frame L250 and generates the time authentication information including the extracted authentication object data and the request time T (S-2037).

In S-2037, the authentication information server 210 determines a false frame based on the device management table 21015, so that the authentication information server 210 can recognize a false frame according to a registration state and an operating state of the network terminating device 220.

After S-2037, the time authentication information storage processing unit 11013 stores the generated time authentication information in the time authentication information L1650 of the IP payload L165 and transmits the frame L160 in which the time authentication information is stored to the user device 130 (S-2038).

If it is determined that the difference between the request time T and the time of the internal clock 21010 is greater than the predetermined value in S-2035 ("N" in S-2035 shown in FIG. 13) or if it is determined that the System ID and the Node ID extracted from the frame L250 are not registered in the device management table 21015 or are invalid in S-2036 ("N" in S-2036 shown in FIG. 13), there is a probability that the received frame L250 is falsely transmitted or is falsified. Therefore, the frame identification and authentication information generation unit 21011 determines that the received frame L250 is an invalid frame. Then, the frame identification and authentication information generation unit 21011 transmits a reception rejection response to the user device 130 (S-2039).

Figure 14:
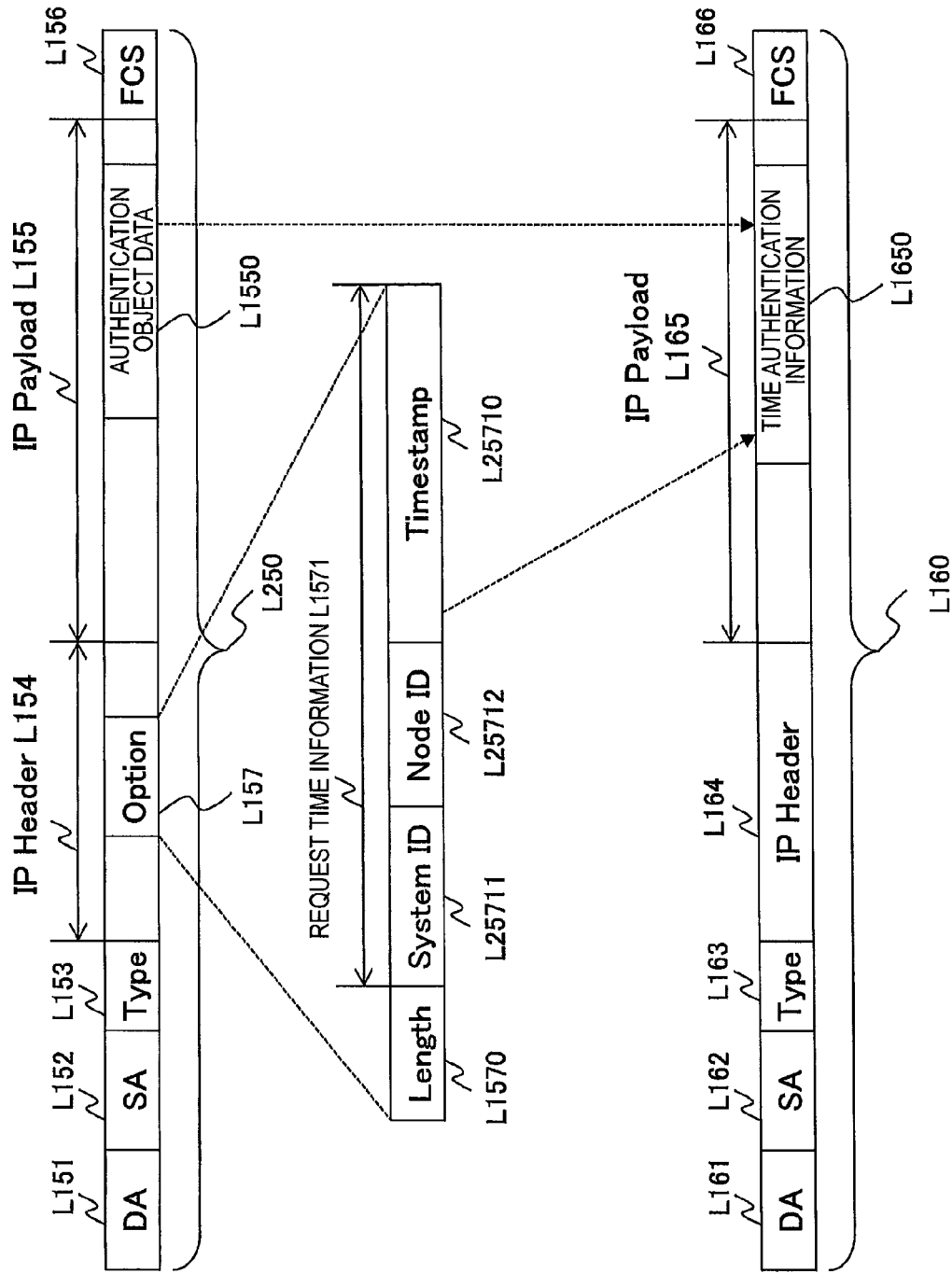
FIG. 14 is an illustration showing examples of a frame format of a frame inputted into the authentication information server of the second embodiment and a frame format of a frame outputted from the authentication information server.

FIG. 14 is an illustration showing examples of a frame format of the frame L250 inputted into the authentication information server 210 of the second embodiment and a frame format of the frame L160 outputted from the authentication information server 210.

Here, the frame L250 received by the authentication information server 210 is the same as the frame L250 transmitted from the network terminating device 220 in the second embodiment for simplicity of the description. However, if there is a communication device through which the frame L250 passes when the frame L250 is transmitted in the transmission network 10, for example, the DA (L151), the SA (L152), and the FCS (L156) of the frame L250 may be updated as needed. If the request time information L2571 and the authentication object data L1550 are held in the frame L250 and the checksum value included in the frame L250 is normal, the aforementioned processing of the second embodiment is performed.

The time authentication information L1650 of the second embodiment includes time authentication information formed by encrypting the request time T of the Timestamp L25710 of the frame L250 and the authentication object data of the authentication object data L1550.

The configuration of the frame L160 generated by the authentication information server 210 is the same as the configuration of the frame L160 shown in FIG. 8.

FIG. 15 is an illustration showing the device management table 21015 of the second embodiment.

The device management table 21015 includes System ID 210151, Node ID 210152, and Valid 210153. The System ID 210151 corresponds to the value of the System ID (L25711) of the frame L250 and the Node ID 210152 corresponds to the value of the Node ID (L25712) of the frame L250.

The Valid 210153 indicates a result of monitoring the network terminating device 220 by the network management system 240 and indicates whether or not the network terminating device 220 is normal. If the network terminating device 220 is normal, the Valid 210153 indicates valid and if the network terminating device 220 is abnormal, the Valid 210153 indicates invalid.

Each entry of the device management table 21015 is updated by the aforementioned device management table control frame, and when the number of the network terminating devices 220 changes, addition or deletion is performed.

If the network terminating device 220 is determined to be abnormal as a result of monitoring the network terminating device 220 by the network management system 240, the network management system 240 updates the Valid 210153 of an entry corresponding to the network terminating device 220 determined to be abnormal to a value indicating invalid by using the device management table control frame.

By using the processing and configurations illustrated in FIGS. 11 to 15, as compared with the first embodiment, the transmission network system of the second embodiment compares the request time information included in a frame and the time of the internal clock 21010 and further collates the System ID and the Node ID with the device management table 21015 in order to identify a frame that is directly inputted into the transmission network 10 with malicious intent. Thereby, the authentication information server 210 of the second embodiment can determine a false frame and can reject reception of the time authentication of the false frame.

Although the transmission network system of the second embodiment performs two operations, which are the comparison of the request time information and the collation of the device management table, in order to determine a false frame, the transmission network system may perform only one of the two operations.

According to the second embodiment, the authentication information server 210 determines whether or not the received frame is false by using the device management table 21015 and the internal clock 21010, so that it is possible to prevent fraud of user and improve reliability of the time authentication.

Third Embodiment

In the third embodiment, an example of a system will be described which stores a comparison result between a request time and an internal clock in a table when an authentication information server receives an authentication request in a transmission network system which performs time authentication based on a request time in a network terminating device installed in a user site when time authentication of data generated or updated by a user is performed through a transmission network. It is assumed that the comparison result is used to evaluate a service or a transmission network which uses time authentication performed by a service provider or a telecommunications company that manages the transmission network.

Figure 16:
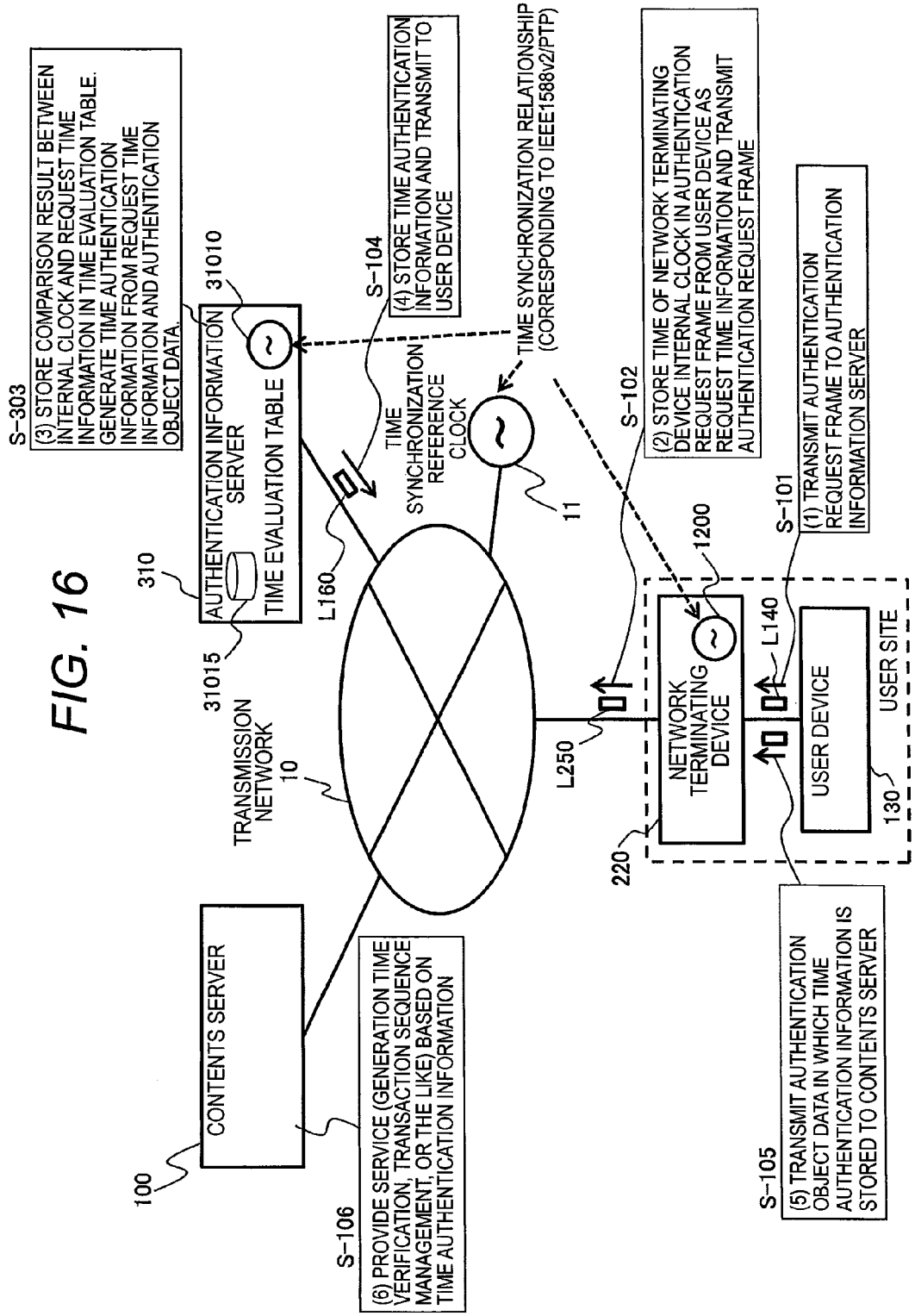
FIG. 16 is an illustration showing a configuration of a transmission network system of a third embodiment.

FIG. 16 is an illustration showing a configuration of the transmission network system of the third embodiment.

In the same manner as the transmission network systems of the first and the second embodiments, the transmission network system of the third embodiment includes the contents server 100, the user device 130, the transmission network 10, and the time synchronization reference clock 11. The transmission network system of the third embodiment further includes an authentication information server 310 corresponding to the authentication information server 110 of the first embodiment and the authentication information server 210 of the second embodiment. The transmission network system of the third embodiment further includes the network terminating device 220 in the same manner as the transmission network system of the second embodiment.

The authentication request frames transmitted in the transmission network system of the third embodiment are the same as the frame L140, the frame L250, and the frame L160 (shown in FIGS. 11 and 14) which are transmitted in the second embodiment.

The authentication information server 310 has functions similar to those of the authentication information server 110 shown in the first embodiment. On the other hand, a difference between the authentication information server 310 and the authentication information server 110 of the first embodiment is that the authentication information server 310 includes an internal clock 31010 and a time evaluation table 31015. The internal clock 31010 is the same as the internal clock 21010 of the second embodiment.

Further, a difference between the authentication information server 310 and the authentication information server 110 is that the authentication information server 310 calculates an evaluation value by using a comparison result between the request time T (Timestamp) included in the request time information and a time of the internal clock 31010 when receiving the frame L250 from the transmission network 10 and registers the calculated evaluation value in the time evaluation table 31015 (S-303).

The details of the processing of the authentication information server 310 will be described with reference to FIGS. 17 to 19.

Figure 17:
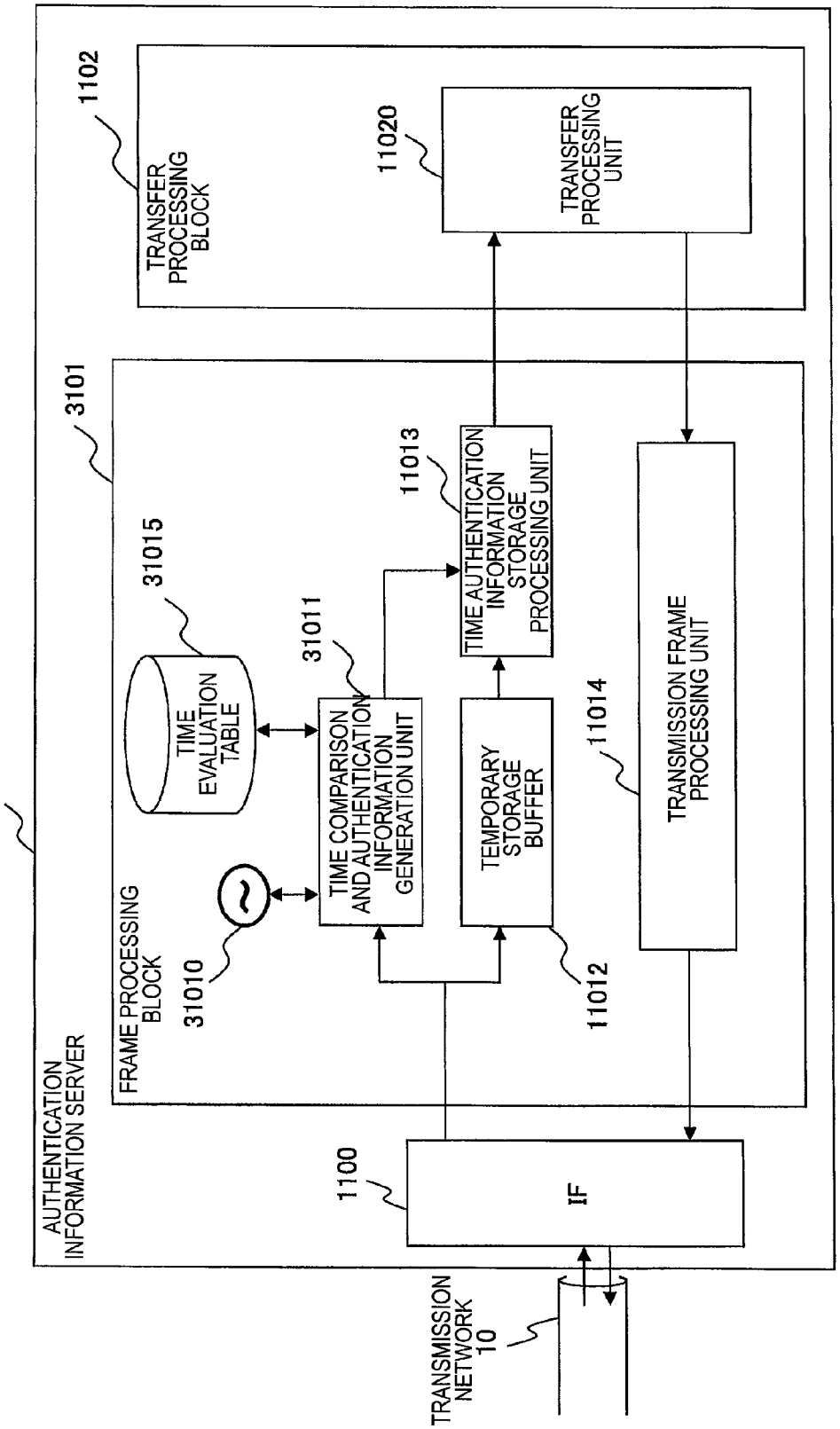
FIG. 17 is an illustration showing an example of functions of an authentication information server of the third embodiment.

FIG. 17 is an illustration showing an example of functions of the authentication information server 310 of the third embodiment.

The authentication information server 310 shown in FIG. 17 has functions to implement the processes shown in FIG. 16. In the same manner as the authentication information server 110 of the first embodiment, the authentication information server 310 includes the interface 1100 and the transfer processing block 1102 as functional units. In the same manner as in the first embodiment, the transfer processing block 1102 of the authentication information server 310 includes the transfer processing unit 11020.

Further, the authentication information server 310 has a frame processing block 3101 corresponding to the frame processing block 1101 of the first embodiment. In the same manner as the frame processing block 1101 of the first embodiment, the frame processing block 3101 includes the temporary storage buffer 11012, the time authentication information storage processing unit 11013, and the transmission frame processing unit 11014.

The frame processing block 3101 has a time comparison and authentication information generation unit 31011 corresponding to the time authentication information generation processing unit 11011 of the first embodiment. Differently from the frame processing block 1101, the frame processing block 3101 includes the internal clock 31010 and the time evaluation table 31015.

Although the functional units included in the authentication information server 310 of the third embodiment are implemented by a physical device such as an integrated circuit, the functional units may be implemented by a program.

When receiving the authentication request frame (frame L250) from the transmission network 10, the time comparison and authentication information generation unit 31011 registers the evaluation value calculated by the comparison result between the request time T (Timestamp) included in the request time information L2571 and the time of the internal clock 31010 in the time evaluation table 31015. Differently from the time authentication information generation processing unit 11011 shown in FIG. 6, the time comparison and authentication information generation unit 31011 performs time comparison processing described later in addition to the time authentication information generation processing.

Figure 18:
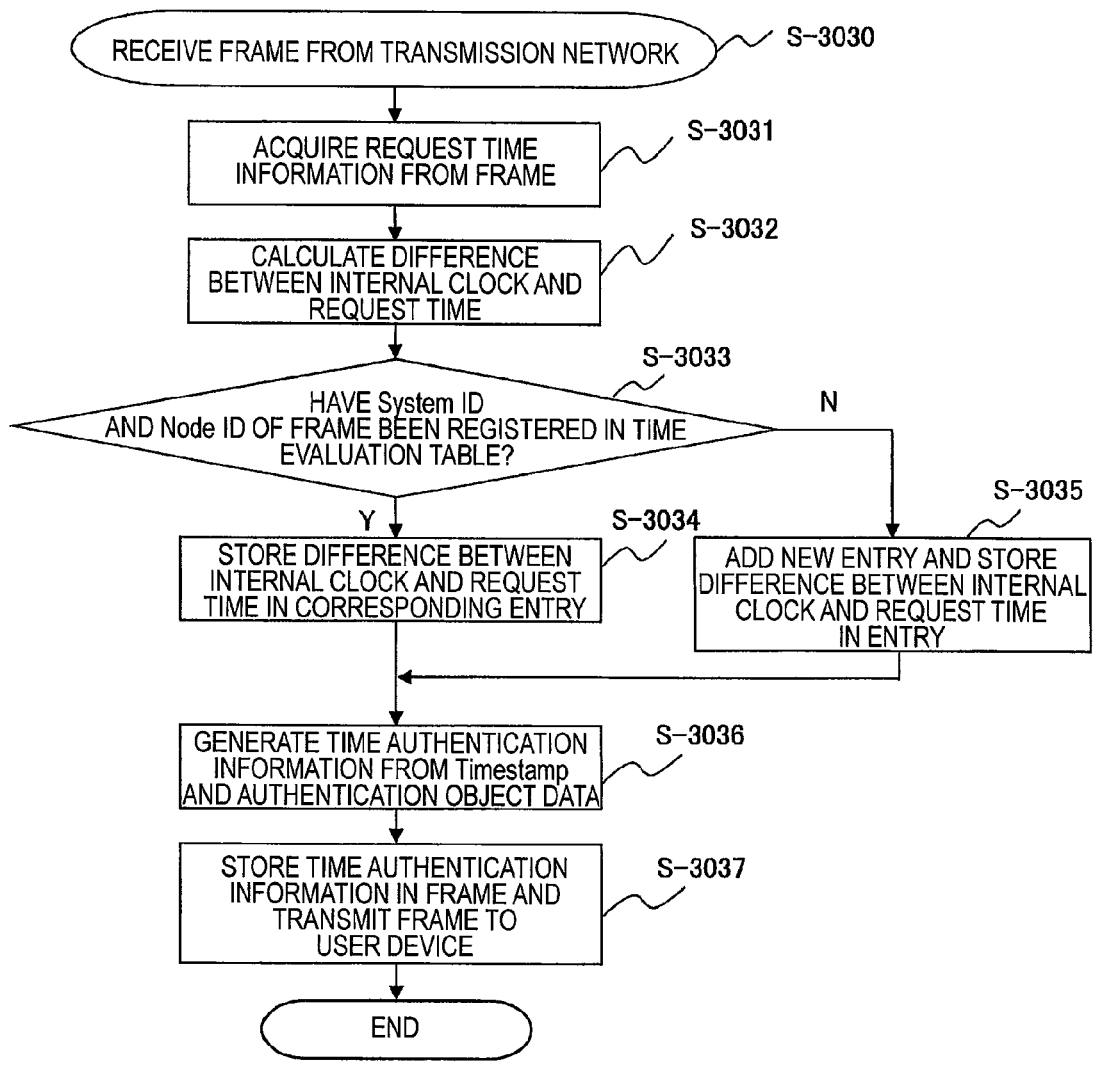
FIG. 18 is a flowchart illustrating an example of processing on a frame by the authentication information server of the third embodiment.

FIG. 18 is a flowchart illustrating an example of processing on the frame L250 by the authentication information server 310 of the third embodiment.

When the IF 1100 of the authentication information server 310 receives the frame L250 from the transmission network 10 (S-3030), the time comparison and authentication information generation unit 31011 extracts the request time information from the request time information L2571 of the frame L250 (S-3031). After S-3031, the time comparison and authentication information generation unit 31011 calculates a difference (absolute value) between the request time T (Timestamp) included in the extracted request time information and the time of the internal clock 31010 (S-3032).

Further, the time comparison and authentication information generation unit 31011 determines whether or not the System ID and the Node ID included in the extracted request time information have been registered in the time evaluation table 31015 (S-3033).

If the System ID and the Node ID included in the extracted request time information are registered in the time evaluation table 31015 ("Y" in S-3033 shown in FIG. 18), the time comparison and authentication information generation unit 31011 stores the difference calculated in S-3032 as time difference information in an entry of the time evaluation table 31015 in which stored value indicates the System ID and the Node ID included in the extracted request time information (S-3034).

If the System ID and the Node ID included in the extracted request time information are not registered in the time evaluation table 31015 ("N" in S-3033 shown in FIG. 18), the time comparison and authentication information generation unit 31011 adds a new entry in the time evaluation table 31015. Then, the time comparison and authentication information generation unit 31011 stores the System ID and the Node ID included in the extracted request time information in the added entry and further stores the difference calculated in S-3032 as the time difference information (S-3035).

After S-3034 or S-3035, the time comparison and authentication information generation unit 31011 generates the time authentication information based on the request time T (Timestamp) and the authentication object data in the same manner as in S-1032 shown in FIG. 5 (S-3036).

After S-3036, the time authentication information storage processing unit 11013 transmits the frame L160 storing the time authentication information to the user device 130 in the same manner as in S-1033 shown in FIG. 5 (S-3037).

FIG. 19 is an illustration showing the time evaluation table 31015 of the third embodiment.

The time evaluation table 31015 includes System ID 310151, Node ID 310152, and time difference information 310153. The System ID 310151 corresponds to the System ID (L25711) of the frame L250 and the Node ID 310152 corresponds to the Node ID (L25712) of the frame L250. In the time difference information 310153, a value is stored in S-3034 or S-3035 shown in FIG. 18.

The time evaluation table 31015 is updated every time the frame L250 is received. By the time evaluation table 31015, the authentication information server 310 can hold a difference between the request time that is stored in the frame L250 by the network terminating device 220 indicated by the System ID and the Node ID and the time of the internal clock 31010 of the authentication information server 310.

In the aforementioned third embodiment, the evaluation value stored in the time difference information 310153 is a transmission delay time in the transmission network 10 and is a difference between the request time T and a time when the authentication information server 310 receives the frame L250. The time comparison and authentication information generation unit 31011 updates the time difference information 310153 of the time evaluation table 31015 by the difference of time when receiving the frame L250 from the network terminating device 220.

However, the time comparison and authentication information generation unit 31011 may calculate a plurality of types of pieces of time difference information as evaluation values for any network terminating device 220 among the network terminating devices 220 indicated by the System ID and the Node ID and store the pieces of time difference information in the time evaluation table 31015. For example, the time comparison and authentication information generation unit 31011 may store a maximum value, a minimum value, and an average value of the time difference information in a certain period of time.

By using the processing and configurations illustrated in FIGS. 16 to 19, the transmission network system described in the third embodiment can manage the transmission delay time between the network terminating device 220 for each user and the authentication information server 310 and can cause an administrator or the like to evaluate the transmission network 10 on the basis of the information stored in the time evaluation table 31015. Further, it is possible to hold the difference between the request time T that is stored in the frame L250 in the network terminating device 220 and the time of the internal clock 31010 when the frame L250 is received by the authentication information server 310, so that it is possible to evaluate a difference between an authentication time in the case in which a conventional time authentication method is used and an authentication time in the case in which the time authentication method of the present embodiment is used.

Further, when the time evaluation table 31015 and the time comparison and authentication information generation unit 31011 are added to the frame processing block 2101 of the second embodiment, the authentication information server 210 of the second embodiment can perform the processing of the third embodiment. In this case, the time comparison and authentication information generation unit 31011 may receive a processing result of the frame identification and authentication information generation unit 21011 and transmit a processing result in the time comparison and authentication information generation unit 31011 to the time authentication information storage processing unit 11013.

The present invention is not limited to the embodiments described above but includes various modified examples. For example, the above embodiments are described in detail to comprehensibly describe the present invention and the present invention is not necessarily limited to the embodiments including all the components that have been described. It is possible to replace part of components of a certain embodiment by components of another embodiment. It is also possible to add components of a certain embodiment to components of another embodiment. Regarding part of components of each embodiment, components of another embodiment can be added to the part, the part can be deleted, and the part can be replaced by components of another embodiment.

The above components, functional units, processing means, and the like may be implemented by hardware by designing part or all of the above components, functional units, processing means, and the like by using, for example, an integrated circuit. The above components and functions may be implemented by software by interpreting and executing a program implementing functions of these components and functions by a processor. Information such as program, table, and file that implement these functions may be placed in a recording device such as a memory, a hard disk, or an SSD (Solid State Drive) or a recording medium such as an IC card, an SD card, or a DVD.

Control lines and information lines that are considered to be necessary for the description are shown, and all control lines and information lines of a product are not necessarily shown. It may be assumed that almost all components are connected to each other in practice.

What is claimed is:

1. A transmission network system comprising:
   a network terminating device connected to a user terminal; and
   an authentication information device connected to the network terminating device through a transmission network connected to a reference clock that holds a reference time,
   wherein the network terminating device includes a terminating internal clock that synchronizes with the reference clock,
   wherein, when receiving a first frame, which includes user data generated in the user terminal, from the user terminal,
   the network terminating device:
      generates a second frame including a time outputted from the terminating internal clock as a request time on the basis of the first frame and including the user data included in the first frame, and
      transmits the second frame to the authentication information device, and
   the authentication information device:
      generates time authentication information based on the request time and the user data which are included in the received second frame,
      generates a third frame including the generated time authentication information, and
      transmits the third frame to the transmission network.

2. The transmission network system according to claim 1, wherein:
   the network terminating device has an interface to connect to the transmission network, and
   the terminating internal clock is updated through the interface by an administrator who manages communication in the transmission network.

3. The transmission network system according to claim 1, wherein:
   the network terminating device stores the request time in an area to be processed in a network layer or a data link layer among areas of the second frame, and
   the authentication information device stores the time authentication information in an area to be processed in an application layer among areas of the third frame.

4. The transmission network system according to claim 3, wherein the authentication information device:
   determines whether or not a received frame is a false second frame, and
   when the received frame is the false second frame, does not generate the time authentication information.

5. The transmission network system according to claim 4, wherein the authentication information device has a device management table that stores information of the network terminating device included in the transmission network system, and
   wherein the authentication information device:
      refers to the device management table and determines whether or not the device that transmits the second frame is a network terminating device included in the transmission network system by using information included in the received second frame, and when the device that transmits the second frame is not a network terminating device included in the transmission network system, determines that the received second frame is the false second frame.

6. The transmission network system according to claim 4, wherein the authentication information device has an authentication internal clock that synchronizes with the reference time, and wherein the authentication information device:

holds a time outputted from the authentication internal clock when receiving the second frame, determines whether or not a difference between the time held when receiving the second frame and the request time included in the received second frame is smaller than or equal to a predetermined time, and when the difference is not smaller than or equal to the predetermined time, determines that the received second frame is the false second frame.

7. The transmission network system according to claim 6, wherein the authentication information device has a time evaluation table for evaluating the time of the authentication internal clock and the time of the terminating internal clock, and wherein the authentication information device:

calculates a time evaluation value based on the time held when receiving the second frame and the request time included in the received second frame, and stores the calculated evaluation value in the time evaluation table.

8. A transmission method of a transmission network system including a network terminating device connected to a user terminal and an authentication information device connected to the network terminating device through a transmission network, where the transmission network is connected to a reference clock that holds a reference time, and the network terminating device has a terminating internal clock that synchronizes with the reference clock, the method comprising:

receiving, by the network terminating device, a first frame which includes user data generated in the user terminal from the user terminal;

generating, by the network terminating device, a second frame including a time outputted from the terminating internal clock as a request time on the basis of the first frame and including the user data included in the first frame;

transmitting, by the network terminating device, the second frame to the authentication information device;

generating, by the authentication information device, time authentication information based on the request time and the user data which are included in the received second frame;

generating, by the authentication information device, a third frame including the generated time authentication information; and transmitting, by the authentication information device, the third frame to the transmission network by the authentication information device.

9. The transmission method according to claim 1, wherein:

the network terminating device has an interface to connect to the transmission network, and the terminating internal clock is updated through the interface by an administrator who manages communication in the transmission network.

10. The transmission method according to claim 1, wherein:

the network terminating device stores the request time in an area to be processed in a network layer or a data link layer among areas of the second frame, and the authentication information device stores the time authentication information in an area to be processed in an application layer among areas of the third frame.

11. The transmission method according to claim 10, further comprising:

determining, by the authentication information device, whether or not a received frame is a false second frame, and wherein, when the received frame is the false second frame, the authentication information device does not generate the time authentication information.

12. The transmission method according to claim 11, wherein the authentication information device has a device management table that stores information of the network terminating device included in the transmission network system, and the transmission method further comprises:

referring, by the authentication information device, to the device management table and determining whether or not the device that transmits the second frame is the network terminating device included in the transmission network system using information included in the received second frame; and when the device that transmits the second frame is not the network terminating device included in the transmission network system, determining, by the authentication information device, that the received second frame is the false second frame.

13. The transmission method according to claim 11, wherein the authentication information device has an authentication internal clock that synchronizes with the reference time, and the transmission method further comprises:

holding, by the authentication information device, a time outputted from the authentication internal clock when receiving the second frame;

determining, by the authentication information device, whether or not a difference between the time held when receiving the second frame and the request time included in the received second frame is smaller than or equal to a predetermined time, and when the difference is not smaller than or equal to the predetermined time, determining, by the authentication information device, that the received second frame is the false second frame.

14. The transmission method according to claim 13, wherein the authentication information device has a time evaluation table for evaluating the time of the authentication internal clock and the time of the terminating internal clock, and the transmission method further comprises:

calculating, by the authentication information device, a time evaluation value based on the time held when receiving the second frame and the request time included in the received second frame; and storing, by the authentication information device, the calculated evaluation value in the time evaluation table.

* * * * *